(12) United States Patent
Resch

(10) Patent No.: US 9,959,076 B2
(45) Date of Patent: May 1, 2018

(54) OPTIMIZED DISK LOAD DISTRIBUTION

(71) Applicant: CLEVERSAFE, INC., Chicago, IL (US)

(72) Inventor: Jason K. Resch, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 784 days.

(21) Appl. No.: 14/292,206

(22) Filed: May 30, 2014

(65) Prior Publication Data

US 2014/0281223 A1 Sep. 18, 2014

Related U.S. Application Data

(60) Continuation-in-part of application No. 14/182,393, filed on Feb. 18, 2014, which is a continuation-in-part of application No. 12/817,208, filed on Jun. 17, 2010, now abandoned, and a continuation-in-part of application No. 12/947,941, filed on Nov. 17, 2010, now Pat. No. 8,886,711, which is a division of application No. 12/218,200, filed on Jul. 14, 2008, now Pat. No. 8,209,363, which is a
(Continued)

(51) Int. Cl.
| | |
|---|---|
| H04L 12/24 | (2006.01) |
| G06F 3/06 | (2006.01) |
| H04L 29/08 | (2006.01) |
| G06F 11/10 | (2006.01) |
| G06F 21/62 | (2013.01) |
| H04L 9/08 | (2006.01) |

(52) U.S. Cl.
CPC .............. *G06F 3/067* (2013.01); *G06F 3/065* (2013.01); *G06F 3/0619* (2013.01); *G06F 11/1092* (2013.01); *G06F 21/6272* (2013.01); *H04L 9/085* (2013.01); *H04L 9/0894* (2013.01); *H04L 67/1097* (2013.01); *G06F 2211/1028* (2013.01); *G06F 2221/2107* (2013.01)

(58) Field of Classification Search
CPC ................................ H04L 41/12; H04L 41/28
USPC .......................................................... 709/203
See application file for complete search history.

(56) References Cited

U.S. PATENT DOCUMENTS

| 4,092,732 A | 5/1978 | Ouchi |
| 5,454,101 A | 9/1995 | Mackay et al. |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Adnan Mirza
(74) *Attorney, Agent, or Firm* — Garlick & Markison; Timothy W. Markison; Kelly H. Hale

(57) ABSTRACT

A method in a distributed storage (DS) unit begins by the unit receiving one or more data slices to store. The method continues by determining a memory utilization method for the one or more data slices. The method continues when a multiple memory utilization method is determined. The method continues by determining a data slice distribution method. The method continues by storing a plurality of the one or more data slices in the multiple memories using the data slice distribution method and updating a virtual address to physical location table to reflect the storing.

20 Claims, 14 Drawing Sheets

Related U.S. Application Data continuation-in-part of application No. 11/973,613, filed on Oct. 9, 2007, now Pat. No. 8,285,878.

(60) Provisional application No. 61/256,419, filed on Oct. 30, 2009.

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2003/0204602 | A1* | 10/2003 | Hudson ............... D01D 5/423 709/228 |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0143359 | A1 | 6/2007 | Uppala |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2009/0094251 | A1 | 4/2009 | Gladwin et al. |
| 2009/0094318 | A1 | 4/2009 | Gladwin et al. |
| 2009/0094320 | A1* | 4/2009 | Palthepu ............ G06F 17/30106 709/203 |
| 2010/0023524 | A1 | 1/2010 | Gladwin et al. |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Communication pursuant to Article 94(3) EPC; EP Application No. 08837609.0-1954; May 12, 2017; 7 pages.

* cited by examiner

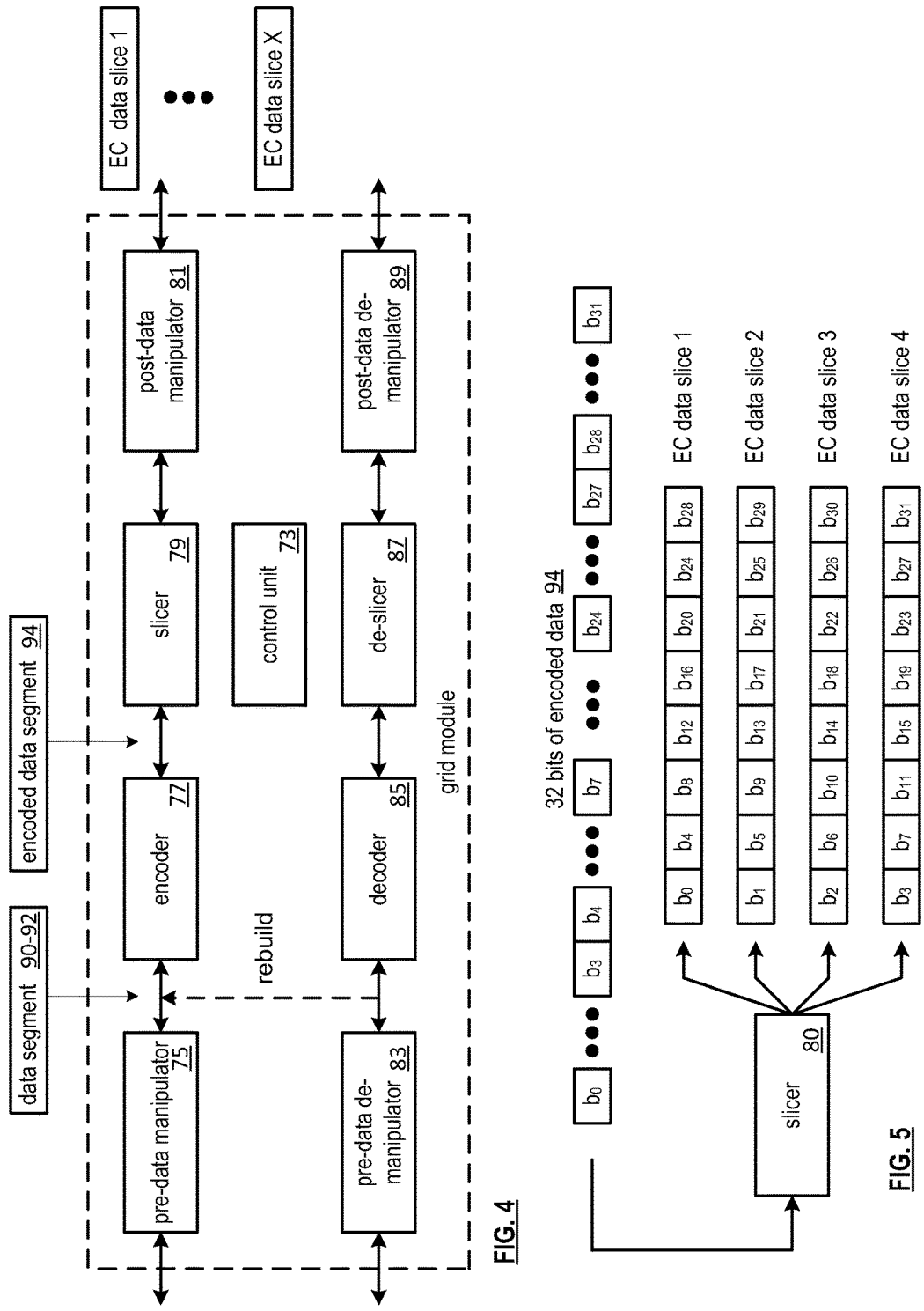

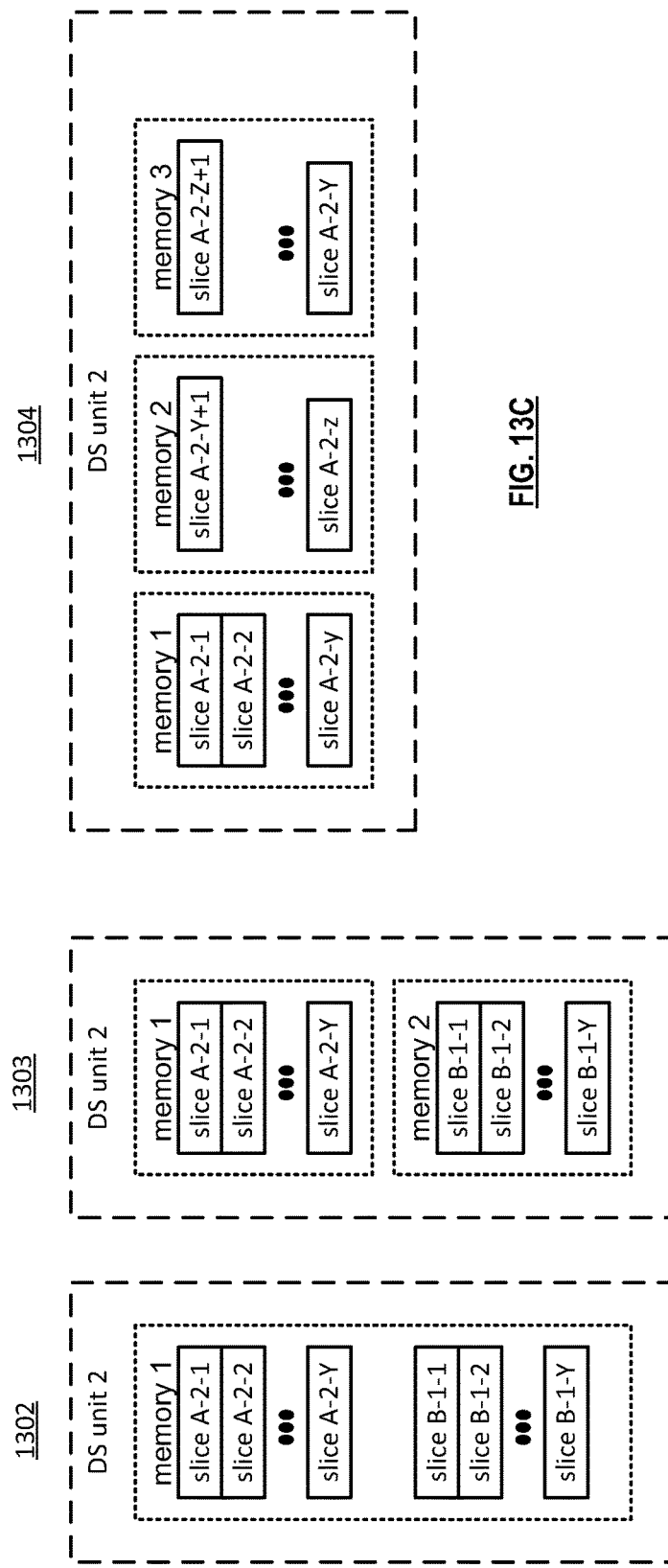

OPTIMIZED DISK LOAD DISTRIBUTION

CROSS REFERENCE TO RELATED PATENTS

The present U.S. Utility patent application claims priority pursuant to 35 U.S.C. § 120 as a continuation-in-part (CIP) of U.S. Utility application Ser. No. 14/182,393, entitled "ENCODED DATA SLICE CACHING IN A DISTRIBUTED STORAGE NETWORK," filed Feb. 18, 2014, which is a continuation-in-part of U.S. Utility patent application Ser. No. 12/817,208, entitled "ENCODED DATA SLICE CACHING IN A DISTRIBUTED STORAGE NETWORK," filed Jun. 17, 2010, which claims priority pursuant to 35 U.S.C. § 119(e) to U.S. Provisional Application No. 61/256,419, entitled "DISTRIBUTED STORAGE NETWORK DATA ROUTING," filed Oct. 30, 2009, all of which are hereby incorporated herein by reference in their entirety and made part of the present U.S. Utility patent application for all purposes.

The U.S. Utility patent application Ser. No. 14/182,393 claims priority pursuant to 35 U.S.C. § 120 as a continuation-in-part of U.S. Utility application Ser. No. 12/947,941, entitled "FILE SYSTEM ADAPTED FOR USE WITH A DISPERSED DATA STORAGE NETWORK," filed Nov. 17, 2010, which is a divisional of U.S. Utility application Ser. No. 12/218,200, entitled "FILE SYSTEM ADAPTED FOR USE WITH A DISPERSED DATA STORAGE NETWORK," filed Jul. 14, 2008, now U.S. Pat. No. 8,209,363, issued on Jun. 26, 2012, which is a continuation-in-part of U.S. Utility application Ser. No. 11/973,613, entitled, "BLOCK BASED ACCESS TO A DISPERSED DATA STORAGE NETWORK," filed Oct. 9, 2007, now U.S. Pat. No. 8,285,878, issued on Oct. 9, 2012, all of which are hereby incorporated herein by reference in their entirety and made part of the present U.S. Utility patent application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND

Technical Field

This disclosure relates generally to computing and more particularly to storage of information.

Description of Related Art

Computing systems are known to communicate, process, and store data. Such computing systems range from wireless smart phones to data centers that support millions of web searches, stock trades, or on-line purchases every day. Computing processing is known to manipulate data from one form into another. For instance, raw picture data from an image sensor may be compressed, or manipulated, in accordance with a picture compression standard to produce a standardized compressed picture that can be saved or shared with others. Computer processing capability continues to advance as processing speed advances and software applications that perform the manipulation become more sophisticated.

With the advances in computing processing speed and communication speed, computers manipulate real time media from voice to streaming high definition video. Purpose-built communications devices, like the phone, are being replaced by more general-purpose information appliances. For example, smart phones can support telephony communications but they are also capable of text messaging, and accessing the internet to perform functions including email, web browsing, remote applications access, and media communications. Media communications includes telephony voice, image transfer, music files, video files, real time video streaming and more.

Each type of computing system is constructed, and hence operates, in accordance with one or more communication, processing, and storage standards. With such standards, and with advances in technology, more and more of the global information content is being converted into electronic formats. For example, more digital cameras are now being sold than film cameras, thus producing more digital pictures. High growth rates exist for web based programming that until recently was all broadcast by just a few over the air television stations and cable television providers. Digital content standards, such as used in pictures, papers, books, video entertainment, home video, all enable this global transformation to a digital format. Electronic content pervasiveness is producing increasing demands on the storage function of computing systems.

A typical computer storage function includes one or more memory devices to match the needs of the various operational aspects of the processing and communication functions. For example, a memory device may include solid-state NAND flash, random access memory (RAM), read only memory (ROM), a mechanical hard disk drive. Each type of memory device has a particular performance range and normalized cost. The computing system architecture optimizes the use of one or more types of memory devices to achieve the desired functional and performance goals of the computing system. Generally, the immediacy of access dictates what type of memory device is used. For example, RAM memory can be accessed in any random order with a constant response time. By contrast, memory device technologies that require physical movement such as magnetic discs, tapes, and optical discs, have a variable responses time as the physical movement can take longer than the data transfer.

Each type of computer storage system is constructed, and hence operates, in accordance with one or more storage standards. For instance, computer storage systems may operate in accordance with one or more standards including, but not limited to network file system (NFS), flash file system (FFS), disk file system (DFS), small computer system interface (SCSI), internet small computer system interface (iSCSI), file transfer protocol (FTP), and web-based distributed authoring and versioning (WebDAV). An operating systems (OS) and storage standard may specify the data storage format and interface between the processing subsystem and the memory devices. The interface may specify a structure such as directories and files. Typically a memory controller provides an interface function between the processing function and memory devices. As new storage systems are developed, the memory controller functional requirements may change to adapt to new standards.

Memory devices may fail, especially those that utilize technologies that require physical movement like a disc drive. For example, it is not uncommon for a disc drive to suffer from bit level corruption on a regular basis, or complete drive failure after an average of three years of use.

One common solution is to utilize more costly disc drives that have higher quality internal components. Another solution is to utilize multiple levels of redundant disc drives to abate these issues by replicating the data into two or more copies. One such redundant drive approach is called redundant array of independent discs (RAID). Multiple physical discs comprise an array where parity data is added to the original data before storing across the array. The parity is calculated such that the failure of one or more discs will not result in the loss of the original data. The original data can be reconstructed from the other discs. RAID 5 uses three or more discs to protect data from the failure of any one disc. The parity and redundancy overhead reduces the capacity of what three independent discs can store by one third (n−1=3−2=2 discs of capacity using 3 discs). RAID 6 can recover from a loss of two discs and requires a minimum of four discs with an efficiency of n−2. Typical RAID systems utilize a RAID control to encode and decode the data across the array.

Drawbacks of the RAID approach include effectiveness, efficiency and security. As more discs are added, the probability of one or two discs failing rises and is not negligible, especially if more desired less costly discs are used. When one disc fails, it should be immediately replaced and the data reconstructed before a second drive fails. To provide high reliability over a long time period, and if the RAID array is part of a national level computing system with occasional site outages, it is also common to mirror RAID arrays at different physical locations. Unauthorized file access becomes a more acute problem when whole copies of the same file are replicated, either on just one storage system site or at two or more sites. In light of the effectiveness, the efficiency of dedicating 1 to 2 discs per array for the RAID overhead is an issue.

Therefore, a need exists to provide a data storage solution that provides more effective timeless continuity of data, minimizes adverse affects of multiple memory elements failures, provides improved security, can be adapted to a wide variety storage system standards and is compatible with computing and communications systems.

BRIEF DESCRIPTION OF THE SEVERAL VIEWS OF THE DRAWING(S)

FIG. 4 is a schematic block diagram of an embodiment of a grid module in accordance with the present disclosure;

FIG. 5 is a diagram of an example embodiment of error coded data slice creation in accordance with the present disclosure;

Figures 14, 15:
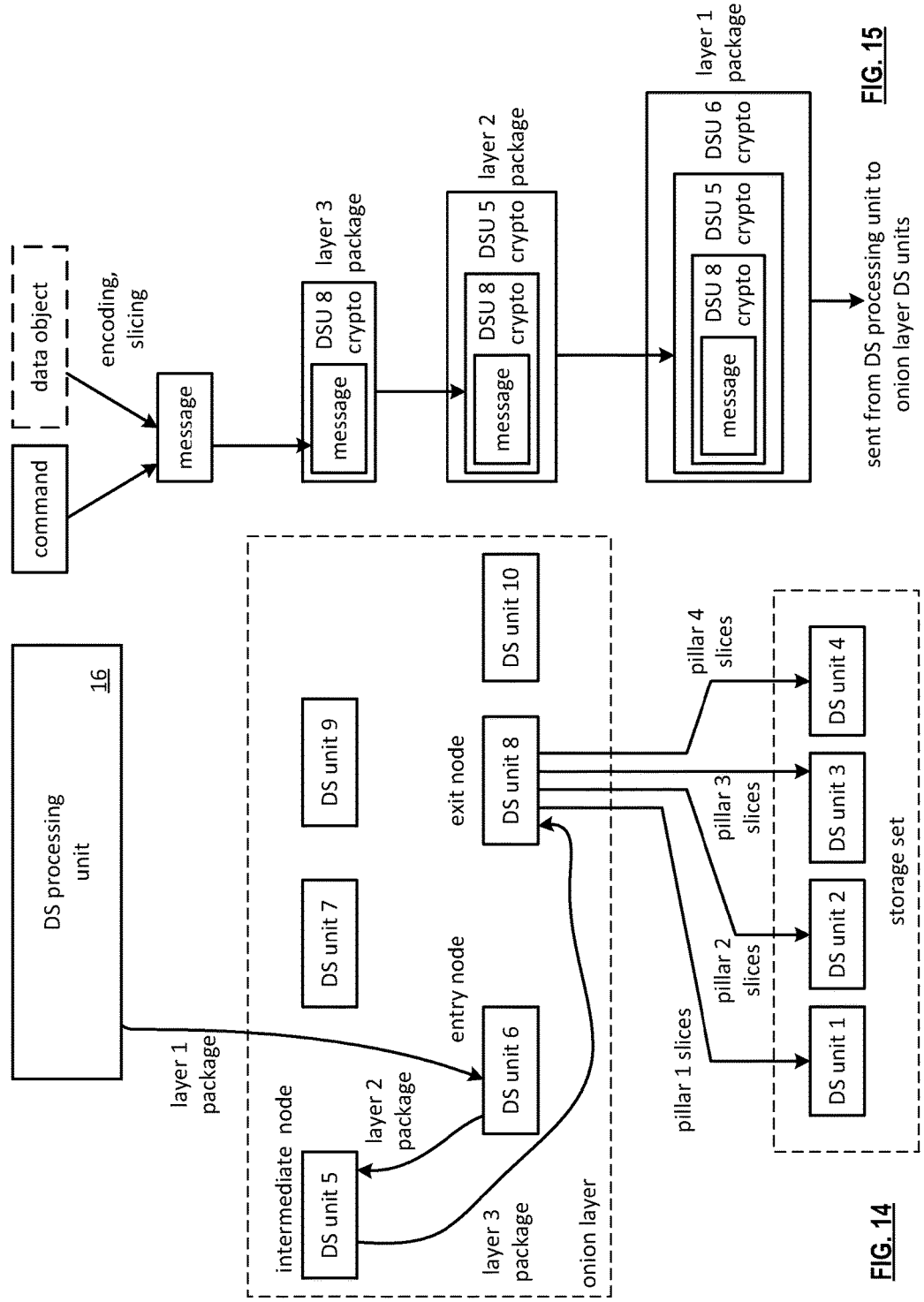
Figure 16:
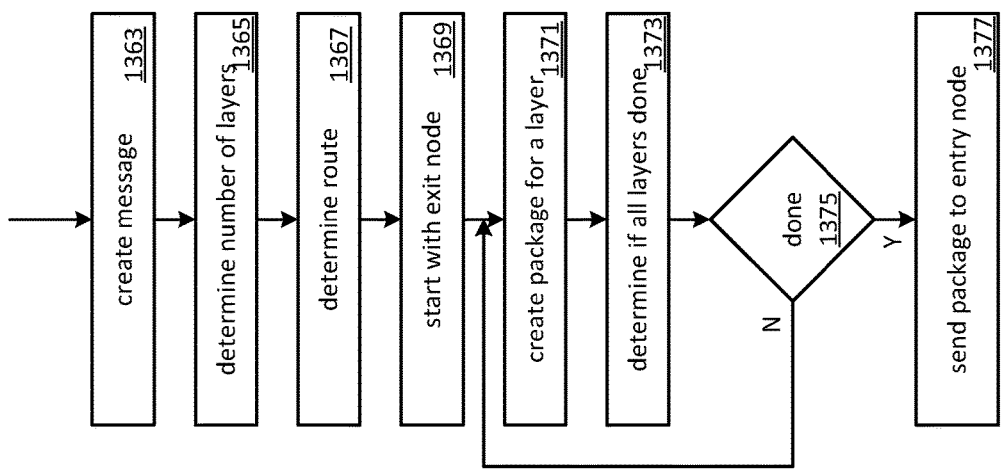

FIGS. 13A, 13B, and 13C, collectively, illustrate schematic block diagrams of example embodiments of a distributed storage (DS) unit in accordance with the present disclosure;

FIG. 14 is a schematic block diagram of another embodiment of a computing system in accordance with the present disclosure;

FIG. 15 is a block diagram of an embodiment of layered message creation in accordance with the present disclosure;

FIG. 16 is a flowchart illustrating the creation of a layered message; and

Figure 17:
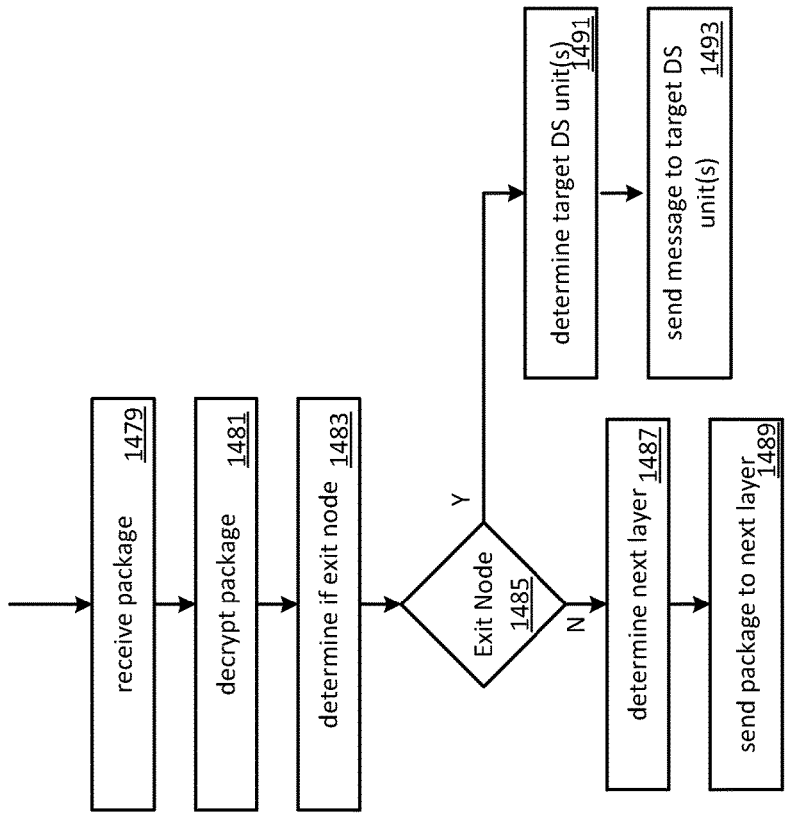

FIG. 17 is a flowchart illustrating the processing of a layered message.

DETAILED DESCRIPTION

Figure 1:
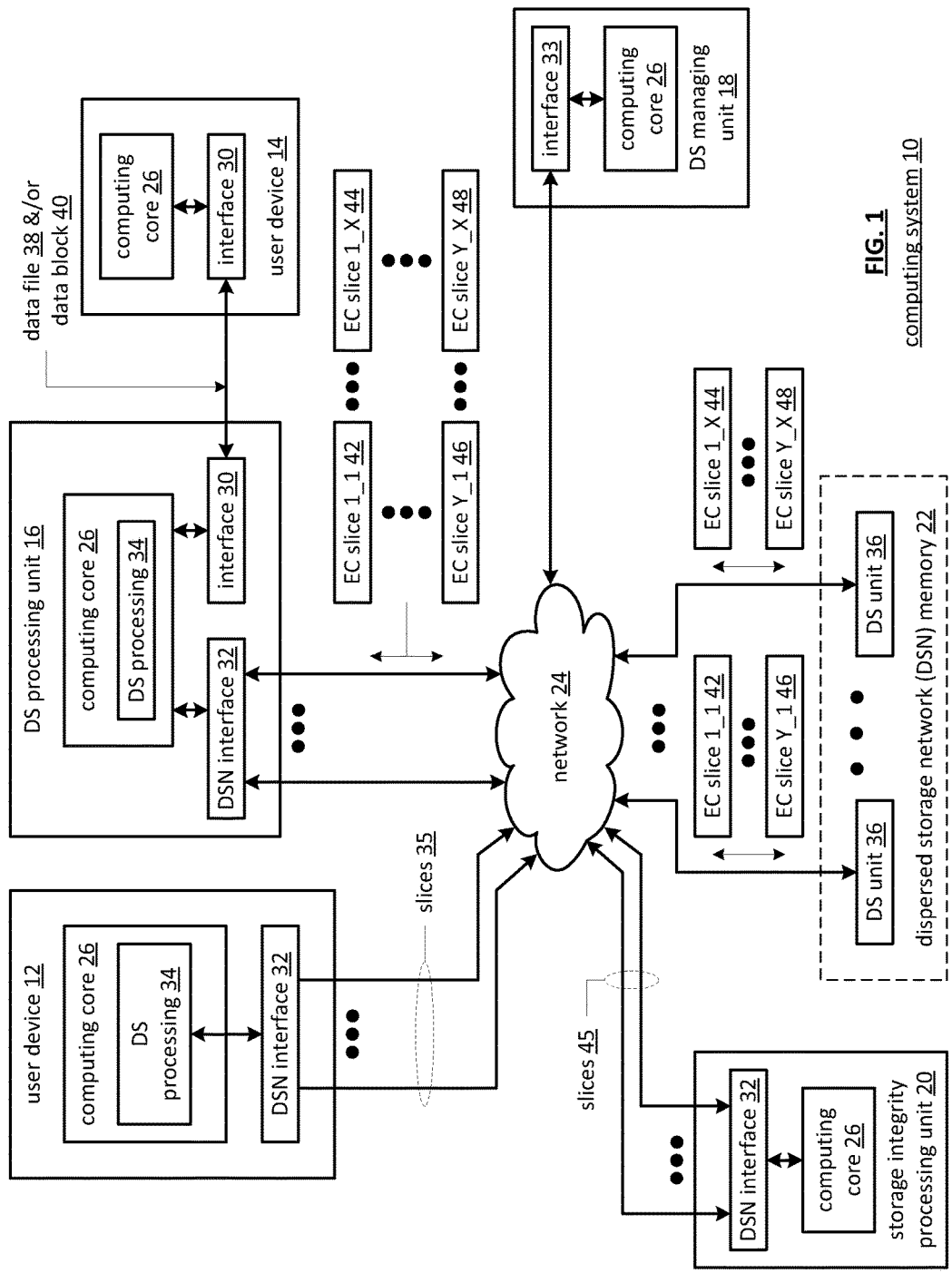
FIG. 1 is a schematic block diagram of an embodiment of a computing system in accordance with the present disclosure.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-17.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices and/or unit's activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it send the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each slice 42-48, the DS processing unit 16 creates a unique slice name and appends it to the corresponding slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the slices 42-48 for transmission via the network 24.

The number of DS units 36 receiving the slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improved data storage integrity and security. Further examples of encoding the data segments will be provided with reference to one or more of FIGS. 2-9.

Each DS unit 36 that receives a slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 35 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
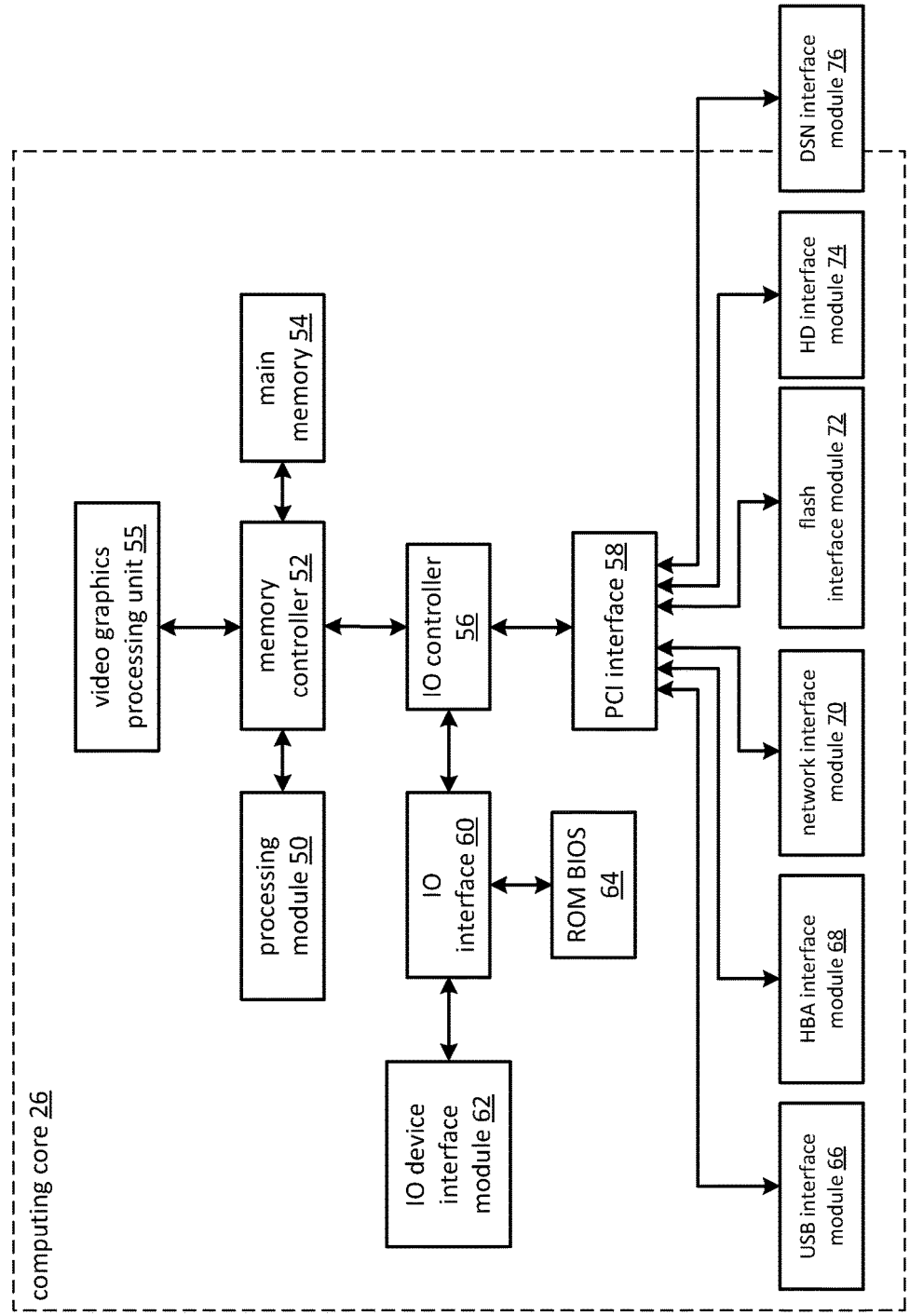
FIG. 2 is a schematic block diagram of an embodiment of a computing core in accordance with the present disclosure.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-17.

Figure 3:
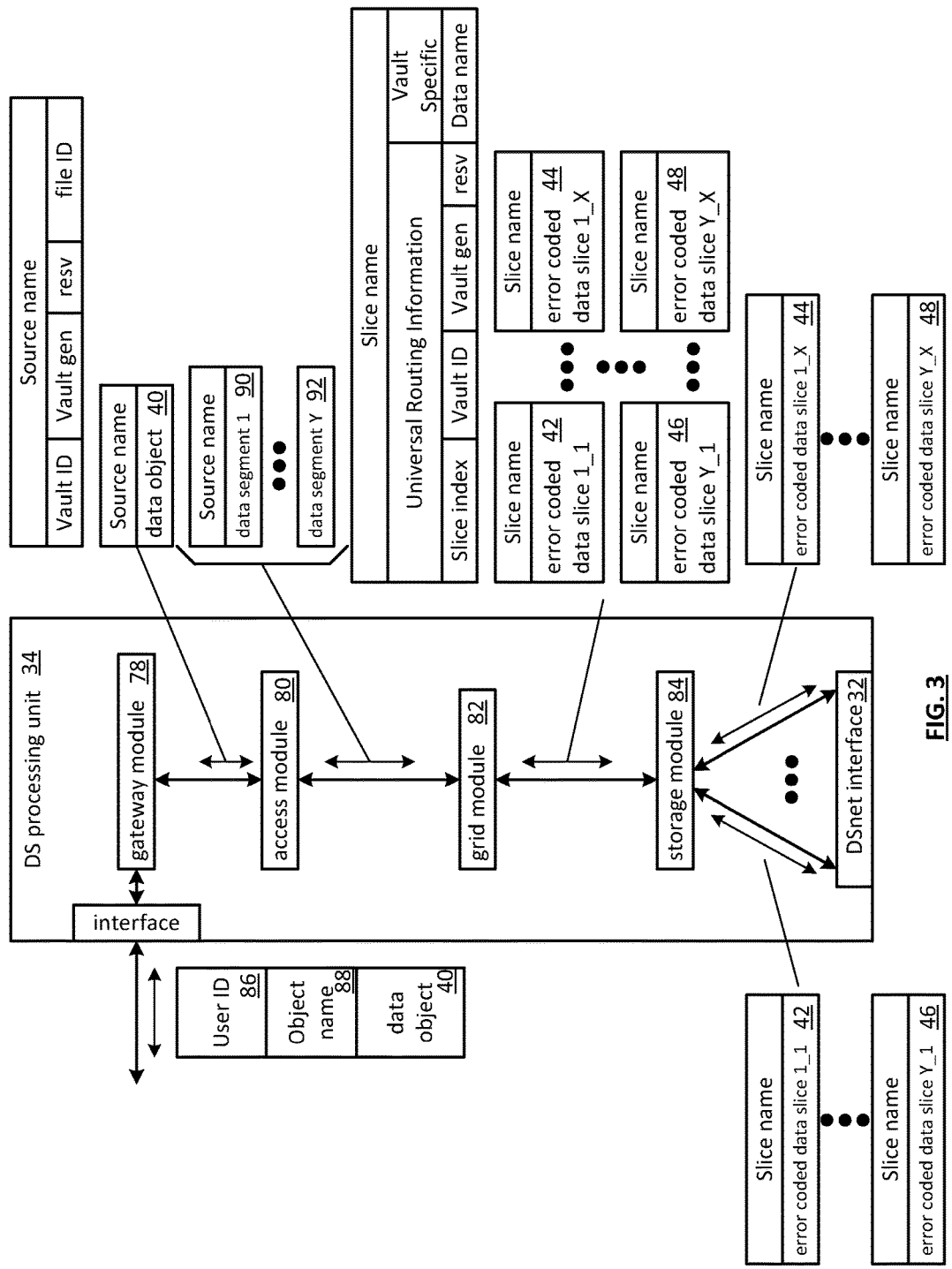
FIG. 3 is a schematic block diagram of an embodiment of a distributed storage processing unit in accordance with the present disclosure.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user 12 or of the DS processing unit 14. The DS processing module 34 may further include a bypass/feedback path between the storage module 84 to the gateway module 78.

In an example of storing data, the gateway module 78 receives an incoming data object (e.g., a data file, a data block, an EC data slice, etc.) that includes a user ID field 86, an object name field 88, and the data field 40. The gateway module 78 authenticates the user associated with the data object by verifying the user ID 86 with the managing unit 18 and/or another authenticating unit. When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, an encryption algorithm, a slicing parameter, a compression algorithm, an integrity check method, caching settings, parallelism settings, and/or other parameters that may be used to access the DSN memory layer.

The gateway module uses the user information to assign a source name to the data. For instance, the gateway module 60 determines the source name of the data object 40 based on the vault identifier and the data object. For example, the source name may contain a data name (block number or a file number), the vault generation number, the reserved field, and the vault identifier. The data name may be randomly assigned but is associated with the user data object.

The access module 62 receives the data object 40 and creates a series of data segments 1 through Y 90-92 therefrom. The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment sized is fixed, then the number of segments Y varies based on the size of data object. For instance, if the data object is an image file of 4,194,304 bytes and the fixed size of each segment is 4,096 bytes, the then number of segments Y=1,024. Note that each segment is associated with the source name.

The grid module 82 may pre-manipulate (e.g., compression, encryption, cyclic redundancy check (CRC), etc.) each of the data segments before performing an error coding function of the error coding dispersal storage function to produce a pre-manipulated data segment. The grid module 82 then error encodes (e.g., Reed-Solomon, Convolution encoding, Trellis encoding, etc.) the data segment or pre-manipulated data segment into X error coded data slices 42-44. The grid module 64 determines a unique slice name for each error coded data slice and attaches it to the data slice.

In some embodiments, the slice name includes a universal routing information field and a vault specific field. In an embodiment, the universal routing information field is 24 bytes and the vault specific field is 24 bytes. The universal routing information field contains a slice index, the vault ID, the vault generation, and the reserved field. The slice index is based on the pillar number n and the vault ID such that it is unique for each pillar (e.g., slices of the same pillar for the same vault for any segment will share the same slice index). The vault specific field contains a data name that may include the file ID and a segment number (e.g., a sequential numbering of the data segments of a simple data object or a data block number).

The data name field may be the same for slice names of slices for the same data segment and may vary for slice names of different data segments. The file ID portion of data name may not vary for any slice name of the same data object. Note that the DS processing module 34 may modify the data name field such that the file ID is not transparent (e.g., produce a data name from a hash of the source name to disguise the file ID).

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X−T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

The grid module 82 also determines which of the DS storage units 36 will store the EC data slices based on a dispersed storage memory mapping associated with the user's vault and/or DS storage unit 36 attributes. The DS storage unit attributes includes availability, self-selection, performance history, link speed, link latency, ownership, available DSN memory, domain, cost, a prioritization scheme, a centralized selection message from another source, a lookup table, data ownership, and/or any other factor to optimize the operation of the computing system.

Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the EC data slices and, when successful, transmits the EC data slices 1 through X of each segment 1 through Y to the DS Storage units. Each of the DS storage units 36 stores its EC data slice and keeps a table to convert the virtual DSN address of the EC data slice into physical storage addresses.

In an example of a read operation, the user device 12 and/or 14 sends a read request to the DS processing unit 14, which authenticates the request. When the request is authentic, the DS processing unit 14 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

FIG. 4 is a schematic block diagram of an embodiment of a grid module 82 that includes a control unit 73, a pre-data manipulator 75, an encoder 77, a slicer 79, a post-data manipulator 81, a pre-data de-manipulator 83, a decoder 85, a de-slicer 87, and/or a post-data de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-data manipulator 75 receives a data segment 90-92 and a write instruction from an authorized user device. The pre-data manipulator 75 determines if pre-manipulation of the data segment 90-92 is required and, if so, what type. The pre-data manipulator 75 may make the determination independently or based on instructions from the control unit 73, where the determination is based a computing system-wide predetermination, a table lookup, vault parameters associated with the user identification, the type of data, security requirements, available DSN memory, performance requirements, and/or other metadata.

Once a positive determination is made, the pre-data manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of d*(X/T), where d is size of the data segment 92, X is the width or number of slices, and T is the read threshold. In this regard, the corresponding decoding process can accommodate at most X−T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer slices each encoded data segment 94 into 16 encoded slices.

The post-data manipulator 81 performs, if enabled, post-manipulation on the encoded slices to produce the EC data slices. If enabled, the post-data manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-data manipulation may include slice level compression, signatures, encryption, CRC, addressing, watermarking, tagging, adding metadata, and/or other manipulation to improve the effectiveness of the computing system.

In an example of a read operation, the post-data de-manipulator 89 receives at least a read threshold number of EC data slices and performs the inverse function of the post-data manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-data de-manipulator 83 performs the inverse function of the pre-data manipulator 75 to recapture the data segment.

FIG. 5 is a diagram of an example of slicing an encoded data segment 94 by the slicer 79. In this example, the encoded data segment includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
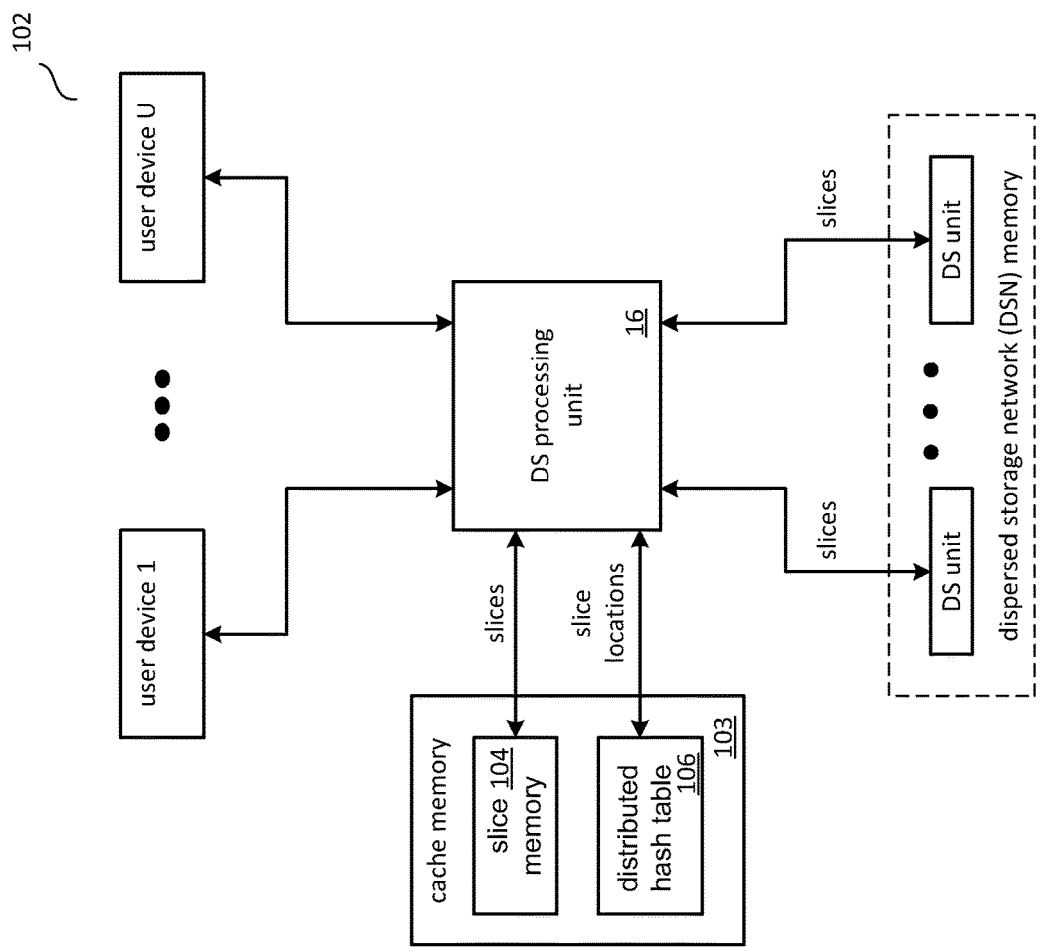
FIG. 6 is a schematic block diagram of another embodiment of a computing system in accordance with the present disclosure.

FIG. 6 is a schematic block diagram of another embodiment of a computing system 102 that may provide access to slices from a cache memory in addition to a DSN memory.

The computing system 102 includes a plurality of user devices 1-U, a DS processing unit 16, a cache memory 103, and the DSN memory 22.

One of the user devices 1-U may from time to time request retrieval of a data object by sending a retrieval request message to the DS processing unit 16. The DS processing unit 16 determines where to retrieve the slices to reconstruct the data object. The slices may be located in the cache memory 103. The DS processing unit 16 may have previously stored the slices in the cache memory 103. In another embodiment, at least two DS processing units may communicate with each other to locate and retrieve slices stored in cache memory 103. Note that more than one cache memory may be utilized in the system.

The cache memory 103 includes a slice memory 104 and a distributed hash table (DHT) 106, and may be implemented with one or more of a magnetic hard disk, NAND flash, read only memory, optical disk, and/or any other type of read-only, or read/write memory. In an embodiment, the cache memory 103 may be implemented as part of the DS processing unit.

The slice memory 104 stores EC data slices received as slices from the DS processing unit 16. The slice memory sends the slices to the DS processing unit 16 upon retrieval. Note that the speed of slice retrieval may be faster retrieving slices from the slice memory 104 as compared to retrieving the same slices from the DSN memory.

The DHT 106 lists slice name locations for slices stored in the slice memory. In another embodiment, the DHT 106 lists slice name locations for slices stored in at least one other cache memory.

In an example of operation, the DS processing unit 16 tracks the frequency of retrievals of the same data object from the DSN memory 22. The DS processing unit stores the retrieved slices in the cache memory 103 and updates the DHT 106 when the frequency of retrievals reaches a threshold. The DS processing unit 16 queries the DHT 106 to determine if the slices are stored in the cache memory 103 when receiving a retrieval request from a user device 1-U. The DS processing unit 16 retrieves the slices, reconstructs the data object, and sends the data object to the requesting user device when the DHT query indicates that the slices are stored in the cache memory.

In another example of operation, the DS processing unit 16 deletes slices from the cache memory when the DS processing unit 16 determines that the frequency of retrievals for the slices has fallen below a threshold.

The method to determine when to store slices to the cache memory 103 will be discussed in greater detail with reference to FIG. 7.

Figure 7:
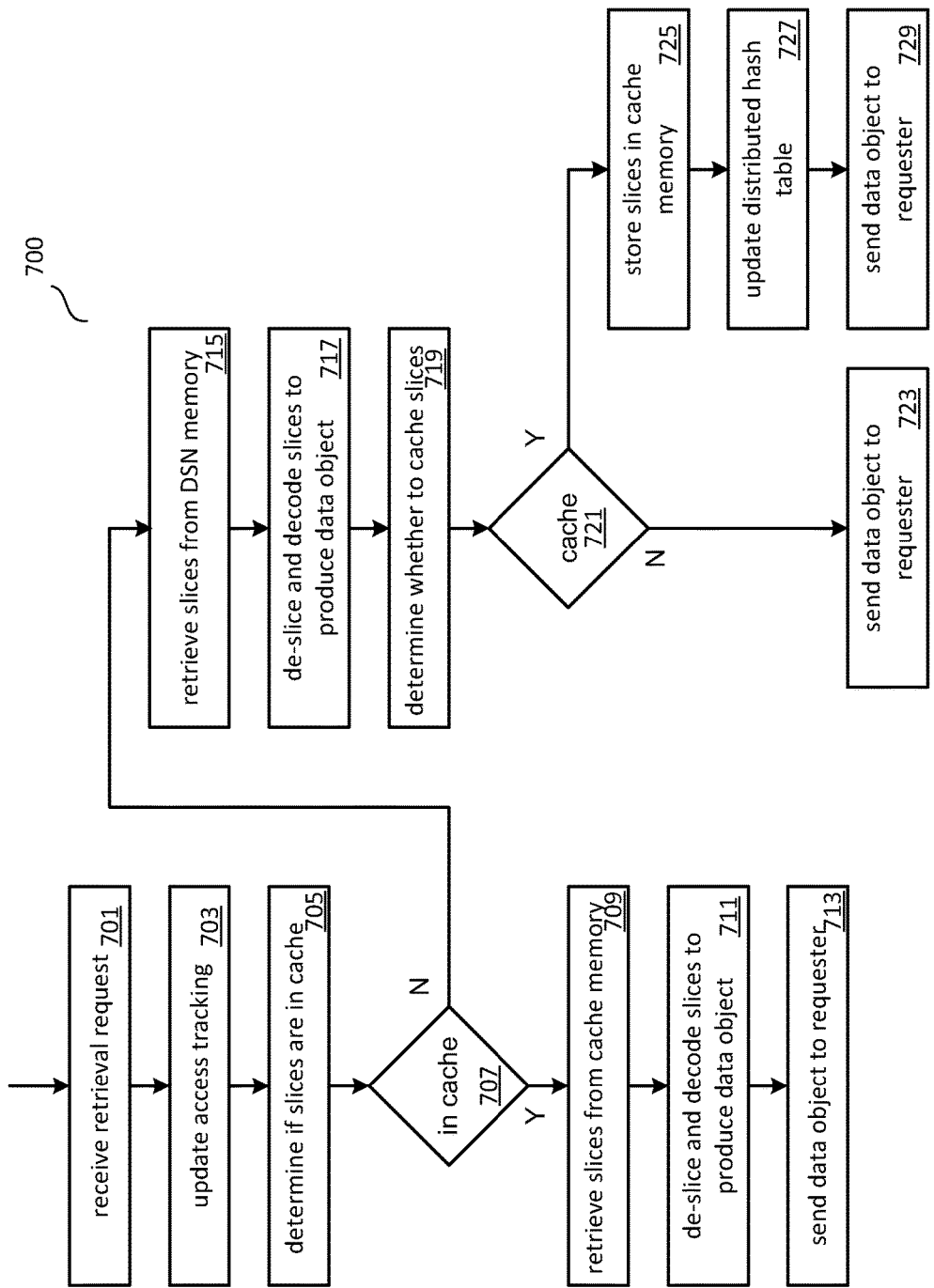
FIG. 7 is a flowchart illustrating the retrieval of distributedly stored data.

FIG. 7 is a flowchart illustrating the retrieval of distributedly stored data where the DS processing unit determines if slices are stored in cache memory before retrieving the slices.

The method 700 begins with block 701, where the DS processing unit receives a data object retrieval request from a requester (e.g., a user device or other system element). The request may include the data object name and a retrieve request message. As illustrated by block 703, the DS processing unit updates access tracking by saving a record of the retrieval with a timestamp in the user vault or other storage area. The DS processing unit may determine the frequency of previous retrievals by averaging the time between the saved timestamps.

As illustrated by blocks 705 and 707, the DS processing unit determines if the slices corresponding to the data object retrieval request are in the cache memory by accessing the DHT and searching for the slice names. Note that DS processing unit can determine the slice names based on the data object name as discussed previously.

As illustrated by block 709, the DS processing unit retrieves the slices from the cache memory when the DS processing unit determines that the slices corresponding to the data object retrieval request are in the cache memory. The DS processing unit may verify the integrity of the slices before decoding the slices by comparing previously stored checksums to stored checksums. As shown by block 711, the DS processing unit de-slices and decodes the slices to produce the data object in accordance with the operational parameters as previously discussed. The DS processing unit sends the data object to the requester, as illustrated by block 713.

As illustrated by block 715, the DS processing unit retrieves the slices from the DSN memory when the DS processing unit determines that the slices corresponding to the data object retrieval request are not in the cache memory. The DS processing unit may verify the integrity of the slices before decoding the slices by comparing previously stored checksums to stored checksums. As illustrated by block 717, the DS processing unit de-slices and decodes the slices to produce the data object in accordance with the operational parameters as previously discussed.

As illustrated by blocks 719 and 721, the DS processing unit determines whether to store the slices in the cache memory based on one or more of a comparison of the access tracking to a threshold (e.g., the retrieval frequency is greater than the threshold), a security level, a priority level, a predetermination, and/or a network loading level. As illustrated by block 723, the DS processing unit sends the data object to the requester when the DS processing unit determines not to store the slices in the cache memory.

As illustrated by block 725, the DS processing unit stores the slices in the cache memory and updates the DHT, as illustrated by block 727, with the slice names and cache memory location when the DS processing unit determines to store the slices in the cache memory. As illustrated by block 729, the DS processing unit sends the data object to the requester.

Note that the DS processing unit may determine whether to delete slices in the cache memory based on one or more of a comparison of the access tracking to a threshold (e.g., the retrieval frequency is less than the threshold), the security level, the priority level, the predetermination, and/or the network loading level. The DS processing unit deletes the slices from the cache memory and removes the slice names from the DHT when the DS processing unit determines to delete slices in the cache memory.

Figure 7A:
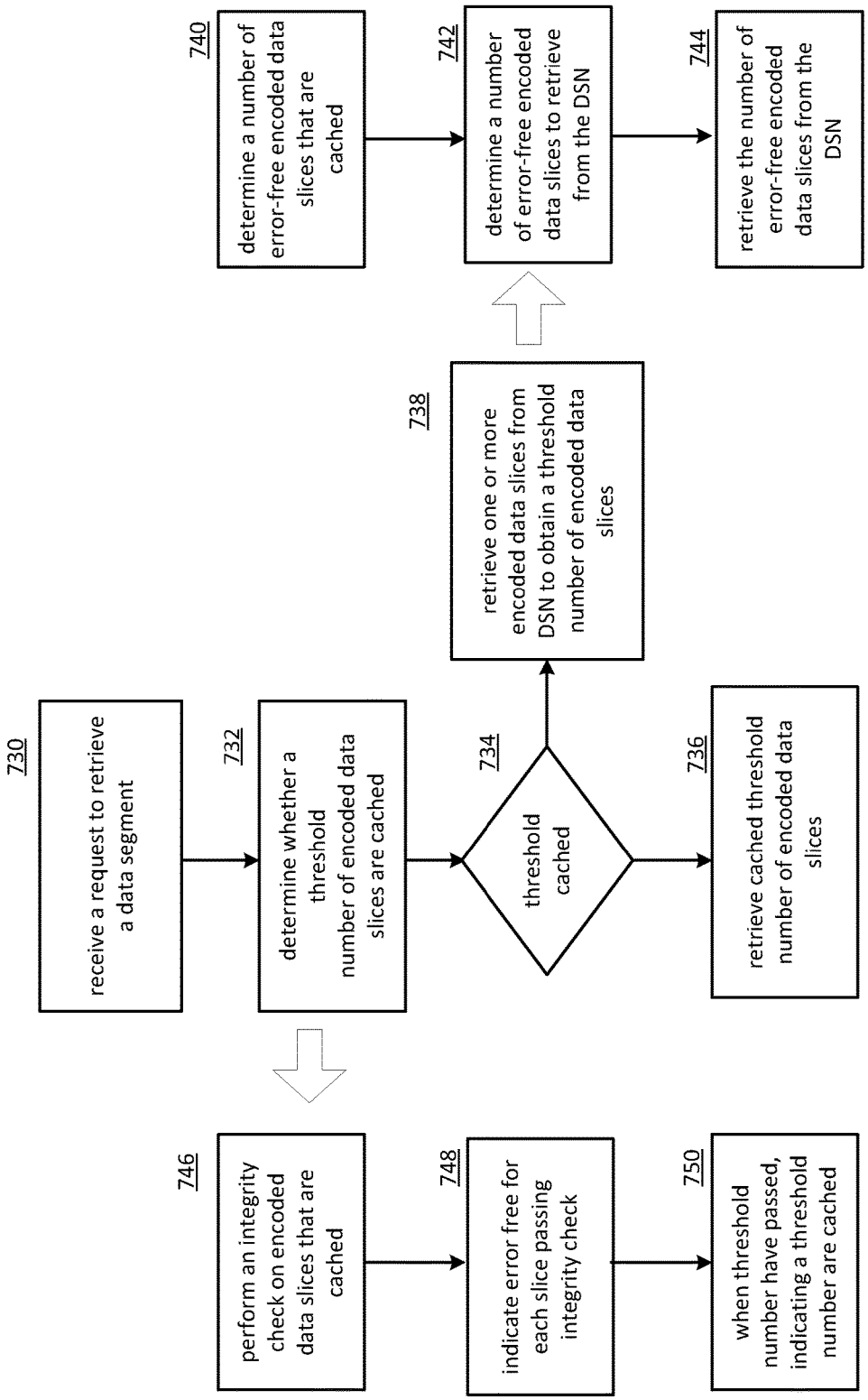
FIG. 7A is a flowchart illustrating an example of retrieving distributedly stored data in accordance with the present disclosure.

FIG. 7A illustrates a logic diagram of a method for retrieving an encoded data segment that may be executed by one or more processing modules of one or more computing devices. The method begins at step 730 where the processing module receives a request to retrieve a data segment that is stored as encoded data slices in a distributed storage network (DSN). For example, the data segment is encoded using a dispersed error coding function to produce the encoded data slices, wherein a threshold number of the encoded data slices is sufficient to reconstruct the data segment. As specific example, if the data segment is encoded into 16 encoded data slices and the threshold number of slices is 10, then, as long as any 10 of the 16 slices are retrieved, the data segment can be constructed.

The method continues at step 732 where the processing module determines whether at least the threshold number of encoded data slices is cached in temporary storage that is associated with the processing module. An example of temporary storage was discussed with reference to FIG. 6. As an embodiment of making such a determination, the processing module may execute steps 746-750.

At step 746, the processing module performs an integrity check on individual ones of the at least the threshold number of encoded data slices that are cached in the temporary storage. The determination continues at step 748 where the processing module indicates, for each encoded data slice that passes the integrity check, that the encoded data slice is error free (i.e., is not corrupted, is actually stored in cache, is not outdated, etc.). The determination continues at step 750 where the processing module indicates, when a threshold number of error free encoded data slices have passed the integrity check, that the at least the threshold number of encoded data slices are cached in the temporary storage.

Returning to the main method at step 734, the processing module determines whether at least the threshold number of encoded data slices is cached in the temporary storage. If so, the method continues at step 736 where the processing module retrieves the at least the threshold number of encoded data slices from the temporary storage. The processing module then reconstructs the data segment for the cache stored encoded data slices.

If there is less than a threshold number of encoded data slices cached in the temporary memory, the method continues at step 738 where the processing module retrieves one or more of the encoded data slices from the DSN to obtain the at least the threshold number of encoded data slices. Once the threshold number of slices has been obtained, the processing module reconstructs the data segment. In addition, the processing module may cache the encoded data slices in the temporary memory. As part of the caching of the encoded data slices, the processing module may further store slices names of the cached encoded data slices in a hash table.

The processing module may execute steps 740-744 to retrieve one or more encoded data slices from the DSN. At step 740, the processing module determines a number of error-free encoded data slices that is cached in the temporary storage. At step 742, the processing module determines a number of encoded data slices to retrieve from the DSN based on a difference between the threshold number and the number of error-free encoded data slices. At step 744, the processing module retrieves the number of encoded data slices such that it has a threshold number of encoded data slices. For example, if the data segment is encoded into 16 encoded data slices, the threshold number of 10, and 8 encoded data slices are error-free and cached, then the processing module would retrieve 2 encoded data slices from the DSN. Note that the processing module may execute this method on multiple data segments concurrently, in a serial manner, and/or a combination thereof.

Figure 7B:
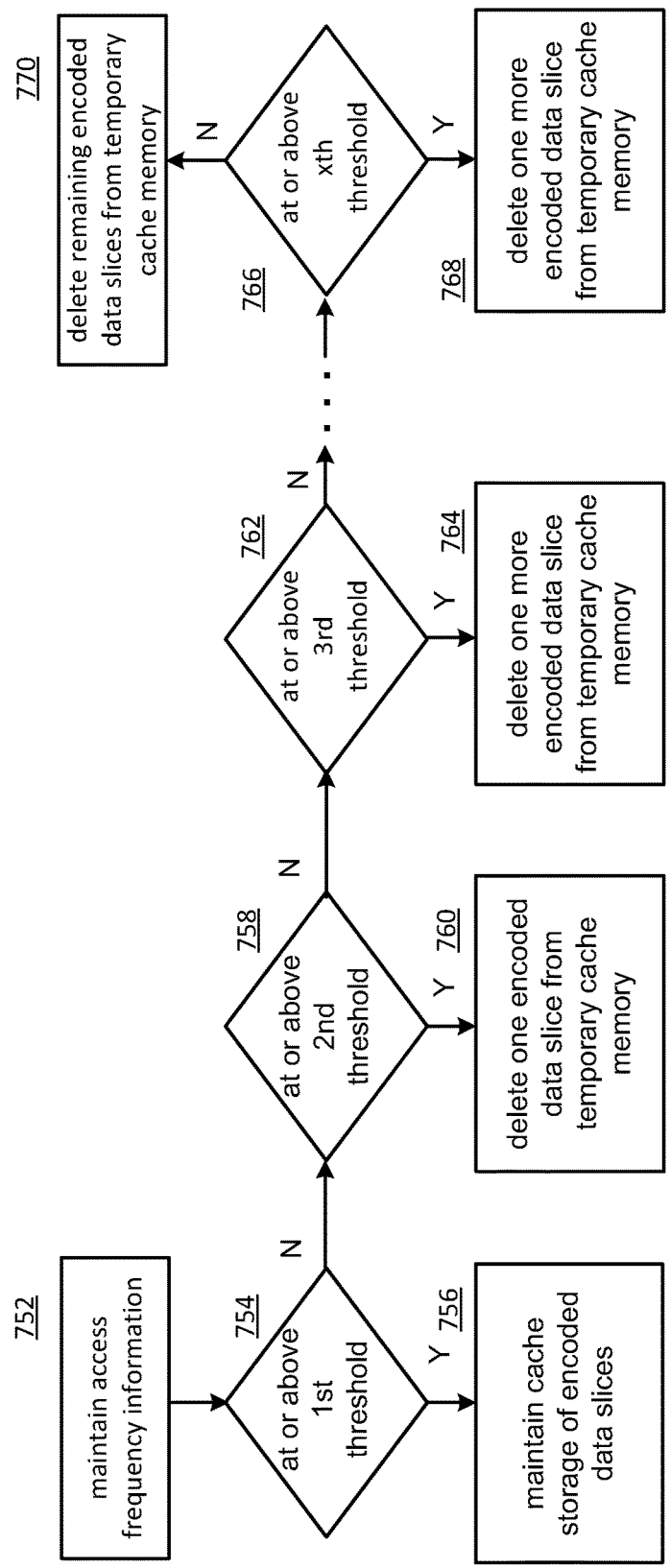
FIG. 7B is a flowchart illustrating an example of modifying cache storage of distributedly stored data in accordance with the present disclosure.

FIG. 7B illustrates a logic diagram of a method for processing cached encoded data slices in temporary memory. The method begins at step 752 where one or more processing modules of one or more computing devices maintain access frequency information regarding retrieval of encoded data slices (of a data segment) from the temporary storage. The method continues at step 754 where the processing module determines whether the access frequency information indicates that accessing of the encoded data slices is at or above a first accessing rate (e.g., at least once per time interval, x times per day, etc.). If so, the method continues at step 756 where the processing module maintains storage of the encoded data slices in the temporary storage.

If not, the method continues at step 758 where the processing module determines whether the access frequency information indicates that accessing of the encoded data slices is at or above a second accessing rate and below the first accessing rate. If so, the method continues at step 760 where the processing module deletes one of the cached encoded data slices from the temporary storage. For example, if the threshold number is 10 and 10 encoded data slices where stored, the processing module would delete 1 encoded data slice, leaving 9 cached encoded data slices. In this way, when the data segment is again requested, the processing module only needs to retrieve 1 encoded data slice from the DSN as opposed to 10 if the all of the encoded data slices were deleted from the temporary memory. This reduces network traffic and improves data retrieval rates.

If the accessing frequency information indicates an access rate below the second threshold, the method continues at step 762 where the processing module determines whether the access frequency information indicates that accessing of the encoded data slices is at or above a third accessing rate and below the second accessing rate. If so, the method continues at step 764 where the processing module deletes another one of the encoded data slices from the temporary storage. Continuing with the example above, the processing module would delete another encoded data slice from the temporary memory, leaving 8 encoded data slices cached in the temporary memory.

This method continues for as many levels (up to the threshold number) as desired. As shown, the method continues at step 766 where the module determines whether the access frequency information indicates that accessing of the encoded data slices is at or above an $x^{th}$ accessing rate. The xth rate may be a fourth rate for the example provided above or may be in the range from 4 to 9. If the accessing frequency information indicates that the access rate is at or above the xth rate, the method continues at step 768 where the processing deletes another one of the encoded data slices from the temporary storage. If, however, the accessing frequency information indicates that the access rate is below the xth rate, the method continues at step 770 where the processing deletes all of the remaining cached encoded data slices of the data segment from the temporary storage. In addition to, or in the alternative, the processing module may delete the encoded data slices from the temporary storage in response to at least one of: a security level of the requested information, a priority level of the requested information, a network loading level, and a memory loading level.

As another alternative, the processing module may determine whether the access frequency information indicates that accessing of the encoded data slices is at or above an accessing rate. If so, the processing module maintains storage of the at least the threshold number of encoded data slices in the temporary storage. If not, the processing module deletes one or more of the encoded data slices from the temporary storage.

Figure 8:
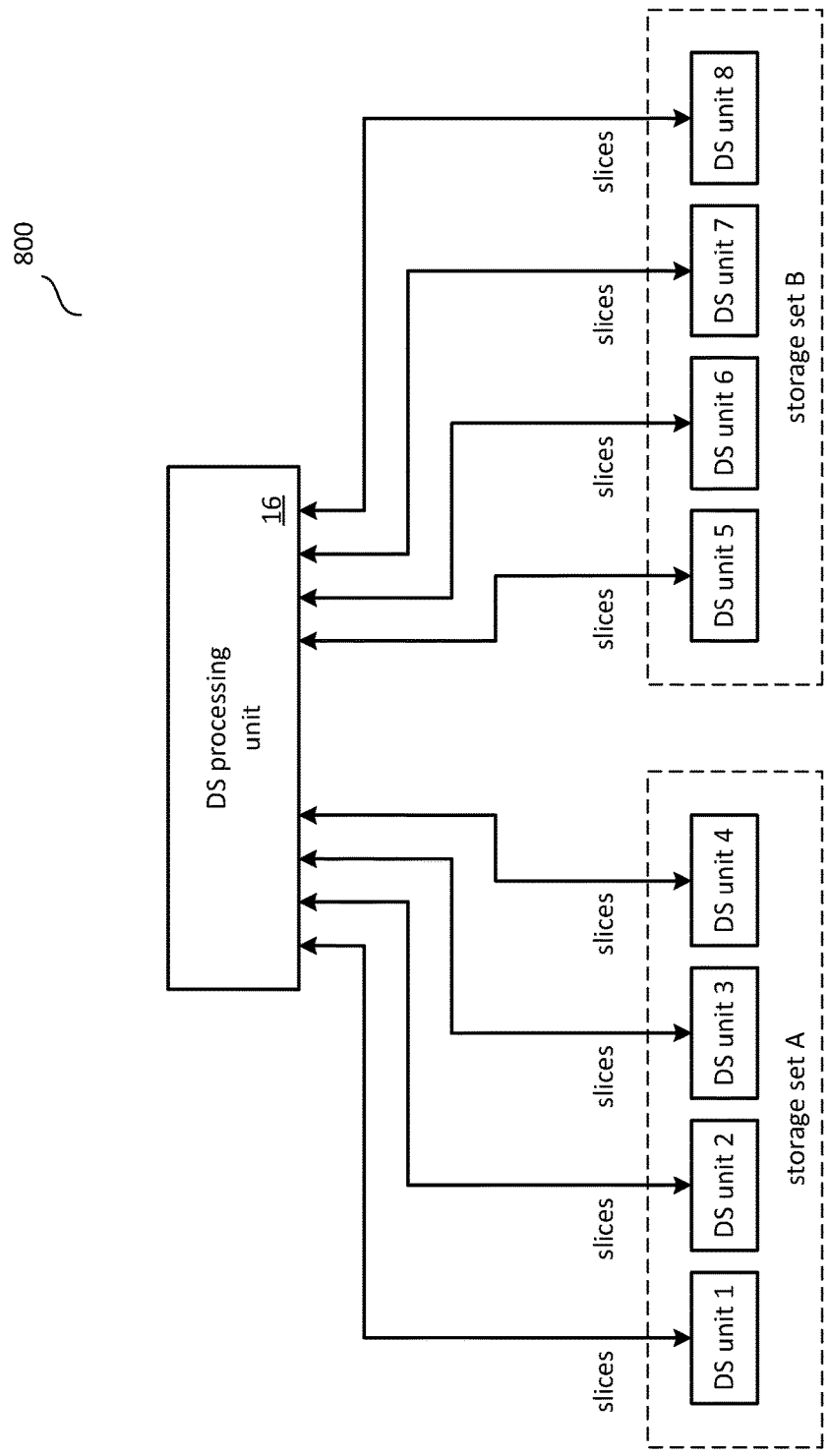
FIG. 8 is a schematic block diagram of another embodiment of a computing system in accordance with the present disclosure.

FIG. 8 is a schematic block diagram 800 of another embodiment of a computing system where two or more DS unit storage sets are utilized to concurrently store and retrieve EC data slices in parallel for the same data object. As used herein the term concurrently and parallel can be considered interchangeable unless otherwise specified, and refer generally to the concept of beginning storage or retrieval of one EC data slice before a previous data slice has finished being stored retrieved.

The computing system includes a DS processing unit 16, a storage set A, and a storage set B. The DS processing unit 16 stores and retrieves EC data slices to/from the storage sets A and B. Note that two or more storage sets may be utilized. A storage set includes DS units that comprise the pillars for one or more vaults. For example, in a 4/3 vault, DS units 1-4 comprise the storage set A. The corresponding second of the two or more storage sets includes DS units 5-8 in storage set B. Both storage sets may be utilized to store slices for the same vault. Note that the two or more storage sets may be in the same or different DSN memories.

In another embodiment of a 16/10 DSN system, storage set A includes DS units 1-16 and storage set B includes DS units 17-32. In yet another embodiment, the number of DS units in the storage sets A and B are different. For example, storage set A includes DS units 1-16 for a 16/10 approach and storage set B includes DS units 17-20 for a 4/3 approach.

The DS processing unit 16 may determine how to implement parallelism based on a data type, a priority level, a security level, a request, a command, a predetermination, a desired performance level, a system loading indicator, and/or a system configuration. For example, the DS processing unit 16 may utilize two storage sets when the DS processing unit determines that two storage sets will meet the desired level of performance (e.g., retrieval times).

To implement parallelism, the DS processing unit 16 may operate in one of several embodiments. In a first embodiment, the DS processing unit 16 creates slices for each pillar of a data segment and sends the slices for storage to storage set A substantially in parallel, or concurrently, with creating slices for each pillar of the next data segment and sending the slices for storage to storage set B. In other words, with two storage sets the DS processing unit 16 sends slices for odd data segment numbers to storage set A while in parallel sending slices for even data segment numbers to storage set B. The DS processing unit 16 subsequently retrieves the data object by retrieving slices for each pillar of a data segment from storage set A substantially in parallel with retrieving slices for each pillar of the next data segment from storage set B.

In a second embodiment, the DS processing unit 16 creates slices for each pillar of a series of data segments 1 through X and sends the slices for storage to storage set A substantially in parallel with creating slices for each pillar of the next series of data segments X+1 through Y and sending the slices for storage to storage set B. In other words, with two storage sets the DS processing unit 16 sends slices for a first series of data segment numbers to storage set A while in parallel sending slices for a second series of data segment numbers to storage set B. The DS processing unit 16 subsequently retrieves the data object by retrieving slices for each pillar of a first series of data segments from storage set A substantially in parallel with retrieving slices for each pillar of the next series of data segments from storage set B.

In a third embodiment, the DS processing unit 16 divides the data object into two or more sub-files, labeling them with the same filename but with different vault generations, creating slices for each pillar of the first sub-file and sending the slices for storage to storage set A substantially in parallel, or concurrently, with creating slices for each pillar of the next sub-file (e.g., different vault generation) and sending the slices for storage to storage set B. In other words, with two storage sets the DS processing unit 16 sends slices for a first sub-file (e.g., vault gen 1) to storage set A while in parallel sending slices for a second sub-file (e.g., vault gen 2) to storage set B. The DS processing unit 16 subsequently retrieves the data object by retrieving slices for each pillar of the first sub-file (e.g., vault gen 1) from storage set A substantially in parallel with retrieving slices for each pillar of the second sub-file (e.g., vault gen 2) from storage set B. The DS processing unit then combines the sub-files to recreate the data object.

Figure 9:
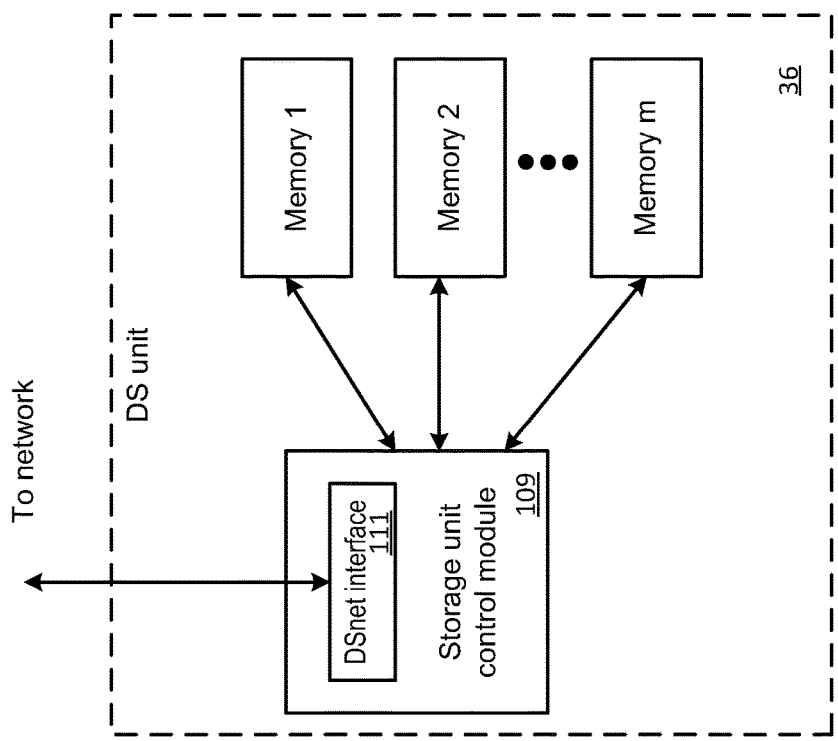
FIG. 9 is a schematic block diagram of an embodiment of a distributed storage (DS) unit in accordance with the present disclosure.

FIG. 9 is a schematic block diagram of an embodiment of a distributed storage (DS) unit 36 that includes a storage unit control module 109 and a plurality of memories that includes memory 1 through memory m. The storage unit control module 109 may be implemented with the computing core of FIG. 2. The memories may be one or more of a magnetic hard disk, NAND flash, read only memory, optical disk, and/or any other type of read-only, or read/write memory. The memories may be implemented as part of or outside of the DS unit 36. For example, memory 1 may be implemented in the DS unit 36 and memory 2 may be implemented in a remote server (e.g., a different DS unit operably coupled to the DS unit 36 via the network).

The storage unit control module 109 may be operably coupled to the computing system utilizing the DSnet interface 111 via the network. The storage unit control module 109 may receive an EC data slice to store via the DSnet interface 111. Note that the slice may be received as part of a batch of slices (e.g., slices of the same pillar for the same data segment). In an embodiment, the storage unit control module 109 determines where (e.g., which address on which of the memories) to store the received EC data slices. The determination may be based on one or more of a number of slices in the batch, slice sizes, metadata associated with the slices, a type of data indicator, a priority indicator, available memory, memory performance data, memory cost data, and/or any other parameter to facilitate desired levels of efficiency and performance.

The storage unit control module 109 may determine to utilize one or more memories 1-m for the slice batch. The storage unit control module 109 may determine to evenly distribute the slice batch across the selected memories or the storage unit control module 109 may determine to vary the number of slices of the slice batch stored in each of the selected memories. For example, the storage unit control module 109 may select memory 2 to store all of the received slice batch since the number of slices in the slice batch was below a threshold (e.g., a relatively small batch). In another example, the storage unit control module 109 may select memories 1-4 to evenly distribute the received slice batch since the number of slices in the slice batch was above a threshold (e.g., a relatively large batch). The storage unit control module 109 maintains a local virtual DSN address to physical location table to keep track of the locations of the slices upon storage such that the slices may be retrieved from the proper memory upon subsequent retrievals. In other words, the table lists the memory number and memory location for each slice name. Note that subsequent retrievals may enjoy a more favorable net retrieval time since memories 1-4 can simultaneously retrieve slices. The method to determine the memories is discussed in greater detail with reference to FIG. 10.

Figure 10:
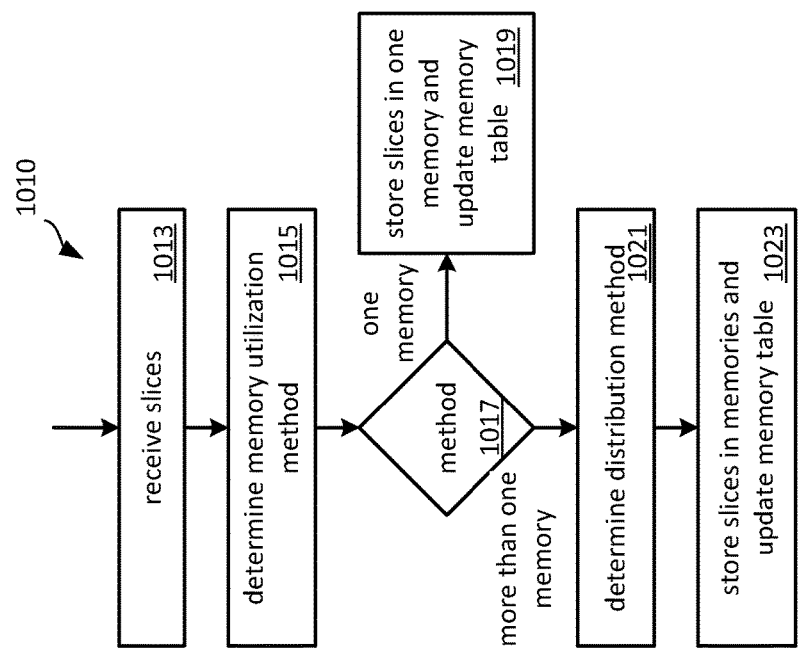
FIG. 10 is a flowchart illustrating the storing of distributedly stored data.

FIG. 10 is a flowchart illustrating the storing of distributedly stored data where the storage unit control module of the DS storage unit receives slices, determines which memories to select for storage of the slices, and stores the slices in the selected memories.

The method 1010 begins at block 1013, where the storage unit control module receives the slice from one or more of the DS processing unit, the storage integrity processing unit, the DS managing unit, and/or the user device. Note that the slice may be received as part of a batch of slices (e.g., slices of the same pillar for the same data segment). The storage unit control module may count the number of slices to determine the number of slices in the slice batch. The slice may have an appended metadata indicating a priority, a data type, a user ID, a security level, a speed of retrieval requirement, a performance requirement, a reliability requirement, and/or a cost requirement.

As illustrated by blocks 1015 and 1017, the storage unit control module determines a memory utilization method based on one or more of number of slices in the slice batch, slice sizes, metadata appended and/or associated with the slices, a performance requirement, a type of data indicator, a priority indicator, available memory, memory performance data, memory cost data, and/or any other parameter to facilitate desired levels of efficiency and performance.

In an embodiment, the storage unit control module determines the memory utilization method to select one memory or more than one memory based in part on the number of slices in the batch. For example, the storage unit control module may select one memory when the number of slices in the slice batch is below a threshold, and more than one memory when the number of slices in the slice batch is above a threshold. As illustrated by block 1019, the storage unit control module stores the slices in the one memory and updates the local virtual DSN address to physical location table when storage unit control module determines the memory utilization method to be one memory.

As illustrated by block 1021, the storage unit control module determines the distribution method when the storage unit control module determines the memory utilization method to be more than one memory. The storage unit control module may determine the distribution method by selecting the number of memories based on one or more of the number of slices in the slice batch, the slice sizes, the priority, the performance requirements, and/or the memory performance data. For example, the storage unit control module may select a higher number of memories when the performance requirements are more demanding (e.g., faster retrieval time as compared to the average required retrieval time). The storage unit control module may select an uneven distribution of the slices between the memories based on the memory performance data (e.g., actual capabilities) of each memory. As illustrated by block 1023, the storage unit control module stores the slices substantially in parallel in the memories and updates the local virtual DSN address to physical location table.

Note that the storage unit control module references the local virtual DSN address to physical location table to determine which memories the slices are located in upon receiving a retrieval request from a requester (e.g., from DS processing). The storage unit control module may retrieve the slices substantially in parallel across two or more memories when the slices for a segment are stored in the two or more memories. The storage unit control module sends the retrieved slices to the requester. Further note that the retrieval time performance of the DS unit may be improved when the slices are substantially retrieved in parallel from the memories.

Figure 11:
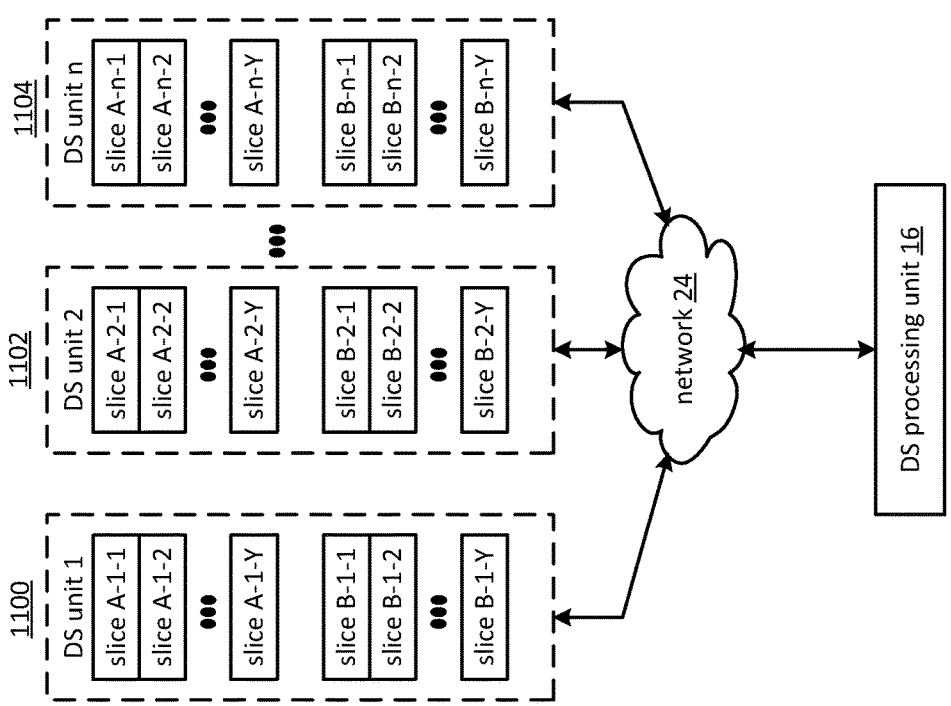
FIG. 11 is a schematic block diagram of an example embodiment of distributed storage (DS) units in accordance with the present disclosure.

FIG. 11 is a schematic block diagram of an example embodiment of distributed storage (DS) units in accordance with the present disclosure. As previously described, each DS unit may decide mapping of slices to memory devices based on various memory selection criteria to optimize retrieval of the one or more data slices (batches). However, to store similar data in a similar fashion (similar storage strategy) across DS units, the DS units may coordinate with each other to create a common mapping (storage strategy) approach (e.g., by data object). Similar data objects are defined as similar, for example, by type, quality, size, access speed needed, longevity of storage (temp or long term), user, location or other comparable metrics.

A good example would be the storage of pictures in multiple DS units. As images are typically large files, it would be beneficial to store the data slices representing the images such that images of similar quality or resolution would be stored in a similar fashion and thus retrieved with a consistent, reliable and predictable sequence (e.g., in 8 memories in parallel for better storage/retrieval performance). Also, storing similar data objects in two memories in one DS unit and 4 memories in another DS unit may result in a less than optimal scenario of different storage sizes and response times. Similar issues can occur with storing in memories of different generations, speeds, capacities, etc.

Storage units (storage control unit modules) 1100, 1102 and 1104 communicate through network 24 to adopt similar approaches to data storage of similar objects. For example, if an image data object (data slices) is stored within a first DS unit 36 in 8 parallel memories, this storage method will be conveyed (e.g., broadcast or by query) to other peer DS units 36 so that they adopt a similar storage method for other similar image data objects. By adopting similar approaches to storage, similar data objects will be stored with consistent distribution methods, consistent retrieval and a higher level of predictability. Typical criteria for selecting common storage strategies include, but are not limited to, similar: response times, retrieval frequencies, R/W error rates, uptimes, maintenance histories, and memory longevity.

In one embodiment, the distributed storage (DS) processing unit 16 or DS managing unit 18 may assist in the coordination and communications workload. In an alternative embodiment, the coordination process is performed by the storage unit control module 109. In addition a table may be stored within memory of any of these units or modules to track storage strategies of data objects (e.g., by type, quality, size, access speed needed, longevity of storage (temp or long term), user, location or other comparable metrics).

Figure 12:
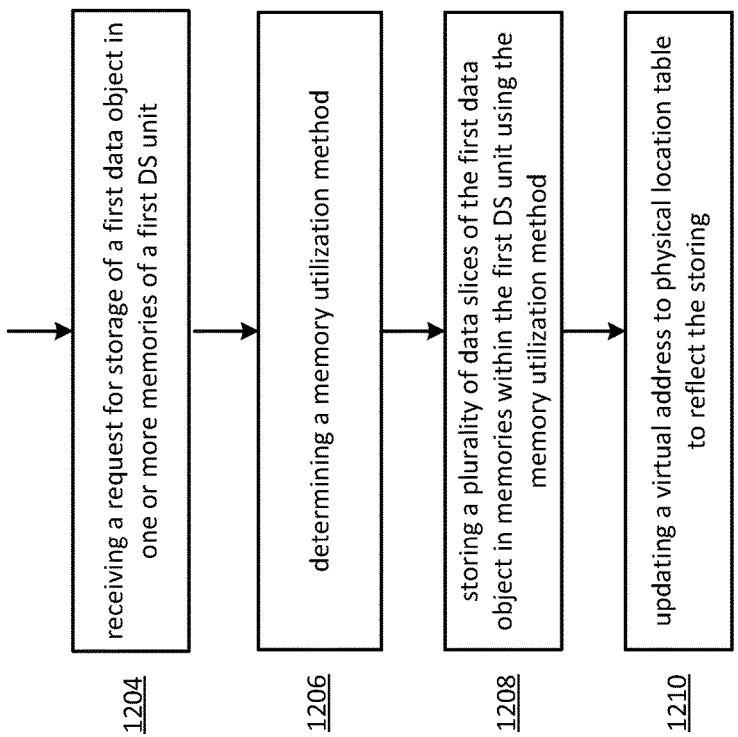
FIG. 12 is a flowchart illustrating another embodiment of the storing of distributedly stored data.

FIG. 12 is a flowchart illustrating another embodiment of the storing of distributedly stored data. The method is used to facilitate the storing of similar data in a similar fashion across DS units (as per FIG. 11), where the DS units may coordinate with each other to create a common storing approach.

The method begins in step 1204 with the DS unit receiving a request for storage of a first data object in one or more memories. In step 1206, the DS unit determines a second DS unit memory utilization method for storing a second similar data object (similar to the first data object). In one embodiment, the DS unit may also determine a data slice distribution method used therein for storing a similar second data object (similar to the first data object) within the second DS unit. Determining, for example by querying, includes comparing criteria for selecting common storage strategies including, but not limited to, response times, retrieval frequencies, R/W error rates, historical performance, maintenance histories, and memory longevity. Alternatives to querying include, but are not limited to, meta data indicators, pushed (broadcast) information from other peer units and a table storing known distribution methods for associated data objects or specific object types (e.g., text, images, video, etc.). In step 1208, a plurality of data slices of the first data object is stored in memories within the first DS unit using the memory utilization method. In alternate embodiments, both the memory utilization method and the data slice distribution method of the second DS unit similar data object are used. In step 1210, a virtual address to physical location table is updated to reflect the storing (location). In addition, in one embodiment, the table storing known or future distribution methods is updated to reflect the distribution method for the stored data object. The table may be stored, accessed and updated in the DS unit 36, the DS processing unit 16, the DS managing unit 18 or other DS modules connected to support the DS units.

FIGS. 13A, 13B, and 13C, collectively, illustrate schematic block diagrams of example embodiments of a distributed storage (DS) unit in accordance with the present disclosure. As previously described, the storage unit control module determines the distribution method when the storage unit control module determines the memory utilization method to be more than one memory. However, when only a single memory is needed, the batches of slices are stored in a single memory (typically in contiguous or a common range of addresses). FIG. 13A illustrates an example of slice batches stored within a single common memory of DS unit 1302.

When more than one memory is utilized, the storage unit control module may determine the distribution method by selecting the number of memories based on one or more of the number of slices in the slice batch, the slice sizes, the priority, the performance requirements, and/or the memory performance data. For example, as shown in FIG. 13B, the storage unit control module may select two memories to store the data and may store the batch of data slices evenly or variably in the two memories of DS unit 1304.

Alternatively, when more than one memory is utilized, a higher number of memories may be selected to satisfy performance requirements that are more demanding (e.g., faster retrieval time as compared to the average required retrieval time). As illustrated in FIG. 13C, the storage unit control module stores the slices substantially in parallel in the three memories of DS unit 1306.

In each of the three scenarios, the local virtual DSN address to physical location table is updated to reflect the actual storage locations.

FIG. 14 is a schematic block diagram of another embodiment of a computing system that may provide improved security by utilizing onion routing to communicate EC data slices.

The computing system includes the DS processing unit 16, an onion layer of DS units 5-10, and a storage set 1110 of DS units 1-4. In another embodiment, the DS processing unit may be replaced with the DS processing in any one or more of the user device, the storage integrity processing unit, and/or the DS managing unit. The storage set 1110 may include any number of DS units that comprise the pillars for one or more vaults. For example, in a 16/10 DSN system the storage set includes 16 DS units while in a 4/3 DSN system the storage set includes 4 DS units as shown.

The DS processing unit 16 creates a layer 1 package to communicate through the onion layer to the storage set. The layer 1 package includes one or more of a message to be communicated to the storage set and slices to be stored in the storage set. The message may include a command such as store, retrieve, status, and delete along with a slice name. For example, the layer 1 package may include a store command and pillar 1 slices to store in DS unit 1, pillar 2 slices to store in DS unit 2, pillar 3 slices to store in DS unit 3, and pillar 4 slices to store in DS unit 4.

The DS processing unit 16 creates the layer 1 package based on a determination of a number of layers of a route, and a determination of which DS units (e.g., route nodes) are along the route, or in the chain of DS units. The DS processing unit 16 performs the determination of the number of route layers and which DS unit nodes based on one or more of a security requirement, a retrieval performance requirement, a random number, a timer, a predetermined sequence, a user ID, a vault ID, a type of data indicator, DS unit availability, DS unit performance history, a network loading indicator, a regional path requirement, and/or a priority indicator. For example, the DS processing unit may select three layers and DS units 5, 6, and 8 to serve as the nodes in the onion layer when a moderate security requirement and a moderate retrieval performance requirement is indicated. The DS processing unit may select more layers when the security requirement is for greater security. Note that each of the DS units in the onion layer can also be considered to part of a chain of DS units, with the first DS unit representing the first layer, the first link, etc., and the end DS unit representing the innermost onion layer, the last link in the chain, and so on.

Note that the route, or chain, may traverse any number of one or more DS unit nodes in the onion layer. The DS processing unit 16 sends the layer 1 package to an entry node DS unit in the onion layer. The entry node DS unit may pass the package to an intermediate node which may pass the package through a series of intermediate nodes. Note that the route may repeat DS unit nodes. The last intermediate node may pass the package to an exit node. In an embodiment, the entry node and the exit node may be the same DS unit (e.g., no intermediate nodes).

In another embodiment, the DS processing unit 16 may create two or more packages with two or more selections of layers and nodes for the same data segment or data object to send slices through the onion layer to the storage set. In other words, the DS processing unit 16 may select more than one route where some of the slices are split in a first route while other slices traverse a different route. In an embodiment, the DS processing unit may send the two or more packages to two or more entry nodes as the first layer in the onion layer. For example, the DS processing unit 16 may send a first package of data segment 100 to entry node DS unit 7 and a second package of data segment 100 to entry node DS unit 10. In another embodiment, the DS processing unit 16 may send the two or more packages bundled as one initial package to one entry node as the first layer in the onion layer followed by an intermediate node that may split out the two or more packages and forward the two or more packages to other nodes. For example, intermediate node DS unit 5 may split out a first package of data segment 100 and send it to exit node DS unit 8 and DS unit 5 may split out a second package of data segment 100 and send it to exit node DS unit 10. In yet another embodiment, the intermediate node may combine packages and forward a combined package.

The DS processing unit 16 creates the layer 1 package by creating a series of nested onion layer packages. The DS processing unit 16 starts with creating final layer package (e.g., the layer 3 package in the example). The DS processing unit 16 creates the message for the target storage set (e.g., the command and/or EC data slices for storage), appending the exit node designation (e.g., DS unit 8) and encrypting all that using the public key for the exit node (e.g., DS unit 8) to produce the layer 3 package. Next, the DS processing unit 16 creates the next-to-last layer package (e.g., the layer 2 package in the example). In the example, the DS processing unit 16 creates the layer 2 package by appending the intermediate node designation (e.g., DS unit 5) to the layer 3 package and encrypting all that using the public key for the intermediate node (e.g., DS unit 5) to produce the layer 2 package. Next, the DS processing unit 16 creates the entry node layer package (e.g., the layer 1 package in the example). In the example, the DS processing unit 16 creates the layer 1 package by appending the entry node designation (e.g., DS unit 6) to the layer 2 package and encrypting all that using the public key for the entry node (e.g., DS unit 6) to produce the layer 1 package. The flow described above is depicted graphically in FIG. 15. The DS processing unit 16 method to create packages is discussed in greater detail with reference to FIG. 16.

The DS units may store, delete, and retrieve data slices as previously discussed. In an embodiment, the DS units of the onion layer may operate in accordance with one or more roles including the entry node, intermediate node, and/or exit node. The DS unit determines the role based on decrypting and inspecting a received package. The DS unit decrypts the received package utilizing its private key (e.g., the private key is paired with the public key as utilized previously by the DS processing unit to create the package). The DS unit inspects the decrypted package to determine if it contains the end message or a forwarding address designation (e.g., of the next node) appended to yet another encrypted package. Note that the DS unit may not be able to decrypt the next encrypted package since that encrypted package utilizes encryption of the next node.

The DS unit sends the message to the targeted storage set when the DS unit determines its role is the exit node. The DS unit sends the message to the next targeted onion layer node when the DS unit determines its role is the entry or intermediate node. The DS unit method to process packages is discussed in greater detail with reference to FIG. 17.

FIG. 15 is a block diagram of an embodiment of layered message creation where the DS processing unit combines one or more of a command and/or EC data slices from a data object into a message that is wrapped in a series of encrypted layer packages. The graphical illustration depicts the route example of FIG. 13 as was previously discussed.

FIG. 16 is a flowchart illustrating the creation of a layered message where the DS processing unit prepares the package to send through the onion layer to the storage set.

The method begins with the step 1363, where the DS processing unit creates the message. The message may include the command (e.g., store, retrieve, delete, status, etc.) and may include EC data slices (e.g., created from a data object) for one or more pillars and/or supplementary information (e.g., metadata about the data object).

As illustrated by block 1365, the DS processing unit determines the number of route layers based on one or more of a security requirement, a retrieval performance requirement, a random number, a timer, a predetermined sequence, a user ID, a vault ID, a type of data indicator, DS unit availability, DS unit performance history, a network loading indicator, a regional path requirement, and/or a priority indicator for one or more of the other factors. For example, the DS processing unit may select one layer when the retrieval performance requirement indicates a faster than average required retrieval time and the retrieval performance requirement has a high priority indicator.

As illustrated by block 1367, the DS processing unit determines the route based on one or more of a security requirement, a retrieval performance requirement, a random number, a timer, a predetermined sequence, a user ID, a vault ID, a type of data indicator, DS unit availability, DS unit performance history, a network loading indicator, a regional path requirement, and/or a priority indicator for one or more of the other factors. The route may include one or more entry nodes, intermediate nodes, and exit nodes. The route may change from data segment to data segment or for each slice. For example, the DS processing unit may select a route through three different geographic regions when the regional path requirement requires that the route traverse at least three regions and the regional path requirement has a high priority indicator. In another embodiment, the DS processing unit may select two routes and divide the package into two packages as previously discussed.

As illustrated by block 1369, the DS processing unit creates the package starting with the exit node. As illustrated by block 1371, the DS processing unit creates the package for a layer by appending the address of the target layer node to the message (or previous package for subsequent loops) and encrypting that together utilizing the public key for that layer.

As illustrated by blocks 1373 and 1375, the DS processing unit determines if all layers are done by comparing the just completed layer with the entry node layer. The method branches back to block 1371, where the DS processing unit creating the package for a layer (the next layer towards the entry node) when the DS processing unit determines that all layers are not done.

As illustrated by block 1377, the DS processing unit sends the package to the entry node(s) when the DS processing unit determines that all layers are done.

FIG. 17 is a flowchart illustrating the processing of a layered message where the DS unit processes an incoming received package in accordance with the DS unit onion layer role. The DS unit onion layer roles include the entry node, the intermediate node, and/or the exit node. The DS unit determines the role based on decrypting and inspecting a received package.

As illustrated by block 1479, the DS unit receives the package from the DS processing unit or another DS unit (e.g., and intermediate node). As illustrated by block 1481, the DS unit decrypts the received package utilizing its private key (e.g., the private key is paired with the public key as utilized previously by the DS processing unit to create the package).

As illustrated by blocks 1483 and 1485, the DS unit determines if it is the exit node by inspecting the decrypted package. The determination may be based on the package contents including the end message or a forwarding address designation (e.g., of the next node) appended to yet another encrypted package.

As illustrated by block 1491, the DS unit determines the target DS unit(s) of the storage set when the DS unit determines it is the exit node. The determination may be based on inspecting the message to read the DSN addresses. As illustrated by block 1493, the DS unit sends the message to the targeted DS unit(s) of the storage set.

As illustrated by block 1487, the DS unit determines the next layer destination when the DS unit determines it is not the exit node (e.g., it is an intermediate node or the entry node). The determination may be based on inspecting the message to read the designation of the next layer node. As illustrated by block 1489, the DS unit sends the message to the next layer node. The process repeats as described above until the package reaches the exit node.

In addition to the method described previously with regards to sending an outbound message from an originator node to the endpoint distributed storage unit as encoded multiple nested layers through a plurality of intermediate distributed storage units, the methods described below may be utilized to send a response message inbound from the endpoint distributed storage unit to the originator node. The method begins with the step where a processing module of the intermediate distributed storage unit saves the outbound information from the outbound message as it passes through the intermediate distributed storage unit.

The outbound information may include a distributed storage unit identifier corresponding to the distributed storage unit that the outbound message was received from, a distributed storage unit identifier corresponding to the distributed storage unit that the outbound message was sent to next, a message identifier, and/or a decoded key. Note that the processing module may produce the decoded key by decrypting at least a portion of the outbound message utilizing a private key associated with the distributed storage unit. In some embodiments, the processing module can obtain the outbound information from one or more of a lookup, a list, a predetermination a command, a message, or another suitable source.

The method continues with the step where the processing module of the intermediate distributed storage unit receives the inbound message (e.g., a response message to a previous message). The processing module determines where to forward the response message based on a response message identifier, a distributed storage unit identifier corresponding to the distributed storage unit that the inbound message was received from, and the outbound information. For example, the processing module determines to forward the message to DS unit 5 when the response message identifier correlates to a message identifier of the outbound information indicating that the distributed storage unit previously forwarded the outbound message from DS unit 5 to DS unit 2 and the inbound message was received from DS unit 2. The processing module determines the decoded key based on the outbound information (e.g., the previously stored decoded key). The processing module encrypts at least a portion of the inbound message utilizing the decoded key.

The above method repeats such that the inbound message may traverse a plurality of intermediate distributed storage units where each of the plurality of distributed storage units determines where to forward the inbound message, encrypts the inbound message, and forwards the inbound message. Some embodiments of the method end when the inbound message reaches the originator node (e.g., a DS processing unit that sent the original outbound message including each of the plurality of keys utilized by each of the intermediate distributed storage units).

The following method describes the decoding of a received inbound message by a processing module where the inbound message contains a plurality of layers. The processing module may be implemented in a user device, a DS processing unit, the storage integrity processing unit, a DS managing unit, and/or a DS unit. For example, the processing module can be implemented in a DS processing unit that originated an outbound message that corresponds to the received inbound message when the inbound message contains a response message to a message contained in the outbound message.

The method begins with the step where the processing module receives an inbound message from an intermediate distributed storage unit. The processing module determines a message to which the response message corresponds based on a response message identifier that can be included within the inbound message, a lookup table that correlates message identifiers and response message identifiers, and/or the distributed storage unit identifier of the distributed storage unit from which the inbound message was received. The processing module determines a plurality of keys and an order in which the plurality of keys is to be applied to the message based on the message identifier and a lookup table that correlates message identifiers with keys.

The method continues with the step where the processing module decrypts the inbound message utilizing one of the plurality of keys in accordance with the order determined for the plurality of keys. The method repeats the step to decrypt the inbound message utilizing each of the plurality of keys in accordance with the plurality of keys order to produce an unencrypted inbound message. The processing module determines the response message based on the unencrypted inbound message.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present disclosure has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present disclosure has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed disclosure. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method performed in a distributed storage (DS) unit, the method comprises:
   receiving one or more dispersed error encoded data slices, wherein the one or more dispersed error encoded data slices represent a first data object, and further wherein a data object is segmented into a plurality of data segments, and wherein each data segment is dispersed error encoded in accordance with dispersed error encoding parameters to produce a set of dispersed error encoded data slices;
   determining a memory utilization method for the one or more dispersed error encoded data slices, wherein the memory utilization method is based on attributes of the first data object and wherein the memory utilization method is configured to facilitate coordination by the DS unit with other DS units storing data objects similar to the first data object in a distributed storage network (DSN);
   determining whether a plurality of memory devices in the DS unit will be used to store the one or more dispersed error encoded data slices;
   when a plurality of memory devices in the DS unit are to be used to store the one or more dispersed error encoded data slices, determining a dispersed error encoded data slice distribution method;
   storing a plurality of the one or more dispersed error encoded data slices in the plurality of memory devices in the DS unit using the dispersed error encoded data slice distribution method; and
   updating a virtual address to physical location table to reflect the storing.

2. The method of claim 1, wherein the determining a memory utilization method further comprises:
   memory selection criteria optimizing retrieval of the one or more dispersed error encoded data slices, the memory selection criteria including one or more of:
   number of dispersed error encoded data slices;
   slice sizes;
   metadata associated with the dispersed error encoded data slices;
   type of data indicator;
   priority indicator;
   available memory;
   memory performance data; and
   memory cost data.

3. The method of claim 1 further comprises:
   the dispersed error encoded data slice distribution method including one or more of:
   evenly distributing the one or more dispersed error encoded data slices across the plurality of memory devices in the DS unit; and
   varying the distribution of the one or more dispersed error encoded data slices across the plurality of memory devices in the DS unit; and
   mapping data slices associated with contiguous dispersed error encoded data slice name ranges to each of the plurality of memory devices in the DS unit.

4. The method of claim 1 further comprises:
   the determining a memory utilization method for the one or more dispersed error encoded data slices including one or more of:
   when a number of the one or more dispersed error encoded data slices is below a threshold, selecting a specific memory to store all of the received one or more dispersed error encoded data slices; and
   when a number of the one or more dispersed error encoded data slices is above a threshold, selecting multiple memories to distribute the received one or more dispersed error encoded data slices; and
   selecting other DS unit memory utilization methods for similar dispersed error encoded data slices.

5. The method of claim 1 further comprises:
   the virtual address to physical location table maintaining a local virtual distributed storage network (DSN) address to physical location table to keep track of locations of a stored one or more dispersed error encoded data slices of the plurality of the one or more dispersed error encoded data slices.

6. The method of claim 1, wherein the determining a memory utilization method further comprises:
   when the memory utilization method determines only one memory is needed, the dispersed error encoded data slices are stored in the one memory and the virtual address to a physical location table is updated to reflect the storing.

7. A distributed storage (DS) unit comprises:
   an interface operable to receive a request to store one or more dispersed error encoded data slices from a distributed storage network (DSN), wherein a stored one or more slices of the plurality of the one or more dispersed error encoded data slices are encoded using a dispersed error coding function to produce dispersed error encoded data slices, wherein a threshold number of the dispersed error encoded data slices is sufficient to reconstruct the data segment;
   a plurality of physical memories; and
   a storage unit control module operable to:
   receive one or more dispersed error encoded data slices, wherein the one or more dispersed error encoded data slices represent a first data object, and further wherein a data object is segmented into a plurality of data segments, and wherein each data segment is dispersed error encoded in accordance with dispersed error encoding parameters to produce a set of dispersed error encoded data slices;
   determine a memory utilization method for the one or more dispersed error encoded data slices, wherein the memory utilization method is based on attributes of the first data object and wherein the memory utilization method is configured to facilitate coordination by the DS unit with other DS units storing data objects similar to the first data object in a distributed storage network (DSN);
   determine whether a plurality of memory devices in the DS unit will be used to store the one or more dispersed error encoded data slices;
   when a plurality of memory devices in the DS unit will be used to store the one or more dispersed error encoded data slices, determine a dispersed error encoded data slice distribution method;
   store a plurality of the one or more dispersed error encoded data slices in the plurality of memory devices in the DS unit using the dispersed error encoded data slice distribution method; and
   update a virtual DSN address to physical location table.

8. The distributed storage unit of claim 7, wherein one or more dispersed error encoded data slices are part of a batch of dispersed error encoded data slices including one or more of:
- dispersed error encoded data slices of a same pillar;
- dispersed error encoded data slices of a same data segment;
- dispersed error encoded data slices of the same pillar and data segment.

9. The distributed storage unit of claim 8, wherein the storage unit control module is further operable to:
- count a number of dispersed error encoded data slices to determine the number of dispersed error encoded data slices in a batch and select one memory of the plurality of memory devices in the DS unit or more than one memory of the plurality of memory devices in the DS unit based in part on the number of dispersed error encoded data slices in the batch.

10. The storage unit control module of claim 7, wherein the storage unit control module is further operable to:
- coordinate with other DS units to facilitate a common storage approach including one or more of a similar: memory utilization method and a dispersed error encoded data slice distribution method.

11. The distributed storage unit of claim 7, wherein the one or more dispersed error encoded data slices include metadata indicating one or more of:
- a priority;
- data type;
- user ID;
- security level;
- speed of retrieval requirement;
- a performance requirement;
- a reliability requirement; and
- a cost requirement.

12. The distributed storage unit of claim 7, wherein the storage unit control module is further configured to determine the memory utilization method using memory selection criteria optimizing retrieval of the one or more dispersed error encoded data slices, the memory selection criteria including one or more of:
- number of dispersed error encoded data slices;
- dispersed error encoded data slice sizes;
- metadata associated with the dispersed error encoded data slices;
- type of data indicator;
- priority indicator;
- available memory;
- memory performance data; and
- memory cost data.

13. The storage unit control module of claim 7, wherein the storage unit control module is further configured to determine the memory utilization method by selecting one memory device of the plurality of memory devices when a number of dispersed error encoded data slices in a batch is below a threshold and more than one memory device of the plurality of memory devices when the number of dispersed error encoded data slices in the batch is above a threshold.

14. The distributed storage unit of claim 7, wherein the storage unit control module is further configured to determine the dispersed error encoded data slice distribution method by selecting a number of memory devices of the plurality of memory devices based on one or more of:
- a number of dispersed error encoded data slices in a slice batch;
- a dispersed error encoded data slice size;
- a priority;
- performance requirements; and
- a memory performance data.

15. The distributed storage unit of claim 7, wherein the dispersed error encoded data slice distribution method selects a higher number of memories when performance requirements are more demanding.

16. The distributed storage unit of claim 15, wherein the performance requirements include one or more of:
- faster retrieval time as compared to an average required retrieval time.

17. The distributed storage unit of claim 7, wherein the dispersed error encoded data slice distribution method selects from either an uneven distribution or even distribution of the dispersed error encoded data slices between the plurality of memory devices in the DS unit based on performance data of each the plurality of memory devices in the DS unit.

18. The distributed storage unit of claim 7, wherein dispersed error encoded data slices are received from one or more of:
- a distributed storage (DS) processing unit;
- a storage integrity processing unit;
- a user device; and
- a DS managing unit.

19. A method performed in a distributed storage (DS) system, the method comprises:
- receiving a request for storage of a first data object in one or more memories of a first DS unit, wherein a data object is segmented into a plurality of data segments, and wherein each data segment is dispersed error encoded in accordance with dispersed error encoding parameters to produce a set of dispersed error encoded data slices;
- determining a memory utilization method used for storing a similar second data object within a second DS unit, wherein the memory utilization method is based on attributes of the first data object and wherein the memory utilization method is configured to facilitate coordination by the DS unit with other DS units storing data objects similar to the first data object in a distributed storage network (DSN);
- storing a plurality of dispersed error encoded data slices of the first data object in memories within the first DS unit using the memory utilization method; and
- updating a virtual address to physical location table to reflect the storing.

20. The method of claim 19, wherein the determining a memory utilization method includes criteria for selecting common memory utilization strategies including one or more of:
- response times;
- retrieval frequencies;
- R/W error rates;
- historical performance;
- maintenance histories; and
- memory longevity.

* * * * *